United States Patent
Xin et al.

(10) Patent No.: US 11,671,855 B2
(45) Date of Patent: Jun. 6, 2023

(54) METHOD FOR OBTAINING SERVICE DATA AND RELATED APPARATUS

(71) Applicant: HUAWEI TECHNOLOGIES CO., LTD., Shenzhen (CN)

(72) Inventors: Yang Xin, Shanghai (CN); Xiaobo Wu, Shanghai (CN); Haoren Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 16/923,353

(22) Filed: Jul. 8, 2020

(65) Prior Publication Data

US 2020/0344625 A1    Oct. 29, 2020

Related U.S. Application Data

(63) Continuation of application No. PCT/CN2018/123281, filed on Dec. 25, 2018.

(30) Foreign Application Priority Data

Jan. 15, 2018    (CN) .......................... 201810037116.0

(51) Int. Cl.
  *H04W 24/08*    (2009.01)
  *H04L 43/062*    (2022.01)
  *H04W 24/10*    (2009.01)
  *H04W 84/04*    (2009.01)

(52) U.S. Cl.
  CPC ........... *H04W 24/08* (2013.01); *H04L 43/062* (2013.01); *H04W 24/10* (2013.01); *H04W 84/042* (2013.01)

(58) Field of Classification Search
  CPC ... H04W 24/08; H04W 24/10; H04W 84/042; H04W 8/24; H04L 43/062
  See application file for complete search history.

(56) References Cited

U.S. PATENT DOCUMENTS

| | | |
|---|---|---|
| 8,767,584 B2 | 7/2014 | Calippe et al. |
| 10,356,191 B2 | 7/2019 | Glommen et al. |
| 2011/0070863 A1 | 3/2011 | Ma et al. |
| 2013/0260736 A1 | 10/2013 | Amerga et al. |
| 2016/0094395 A1* | 3/2016 | Hu .......................... H04W 4/60 370/254 |

(Continued)

FOREIGN PATENT DOCUMENTS

| | | |
|---|---|---|
| CN | 101227356 A | 7/2008 |
| CN | 101784131 A | 7/2010 |

(Continued)

OTHER PUBLICATIONS

Ericsson,"23.502: Network Internal Exposure in Service Based ARchitecture",SA WG2 Meeting #120 S2-171814, Mar. 27-31, 2017,Total 6 Pages.

(Continued)

*Primary Examiner* — Peter P Chau
(74) *Attorney, Agent, or Firm* — Rimon PC

(57) ABSTRACT

A method and apparatus for obtaining service data are used to implement obtaining service data by a data analysis network element. In the method, the data analysis network element obtains service data from a service network element, to perform big data analysis on the obtained service data, thereby implementing differentiated service assurance.

7 Claims, 15 Drawing Sheets

(56) References Cited

U.S. PATENT DOCUMENTS

| | | | |
|---|---|---|---|
| 2020/0218715 A1* | 7/2020 | Chen | H04W 24/04 |
| 2020/0252813 A1* | 8/2020 | Li | H04W 24/08 |
| 2021/0176650 A1* | 6/2021 | Wang | H04W 8/14 |

FOREIGN PATENT DOCUMENTS

| | | | | |
|---|---|---|---|---|
| CN | 101959133 A | 1/2011 | | |
| CN | 104221411 A | 12/2014 | | |
| CN | 105262773 A | 1/2016 | | |
| CN | 105912679 A | 8/2016 | | |
| CN | 107169081 A | 9/2017 | | |
| EP | 3021609 A1 * | 5/2016 | | H04W 24/08 |

OTHER PUBLICATIONS

3GPP TS 29.520 V0.2.0 (Dec. 1, 2017),3rd Generation Partnership Project;Technical Specification Group Core Network and Terminals;5G System; Network Data Analytics Services;Stage 3(Release 15),Total 32 Pages.

3GPP TR 29.890 V15.0.0 (Dec. 1, 2017);3rd Generation Partnership Project;Technical Specification Group Core Network and Terminals;Study on CT WG3 Aspects of 5G System Phase 1;(Release 15),Total 158 Pages.

Huawei et al.,"Solution for Data Collection Framework",SA WG2 Meeting #127 S2-1836366,Apr. 16, 2018,China,total 4 pages.

Huawei, Discussion about Big Data Driven Network Architecture. SA WG2 Meeting #121, May 15, 2017, Hangzhou, China, S2-173192, 11 pages.

China Telecom, Update NWDA Services in TS23.502. 3GPP TSG SA WG2 Meeting #122 Jun. 26, 2017, San Jose Del Cabo, Mexico, S2-174493, 3 pages.

ATandT et al., NWDA Procedures. SA WG2 Meeting #120, Mar. 27, 2017, Busan, Korea, S2-171695, 3 pages.

Zhimin Li, A research of spam identification and its disposal method. Beijing Institute of Technology Press, Jan. 1, 2015, 7 pages.

* cited by examiner

METHOD FOR OBTAINING SERVICE DATA AND RELATED APPARATUS

CROSS-REFERENCE TO RELATED APPLICATIONS

This application is a continuation of International Application No. PCT/CN2018/123281, filed on Dec. 25, 2018, which claims priority to Chinese Patent Application No. 201810037116.0, filed on Jan. 15, 2018. The disclosure of the aforementioned applications are hereby incorporated by reference in their entireties.

TECHNICAL FIELD

This application relates to the field of communications technologies, and in particular, to a method and apparatus for obtaining service data.

BACKGROUND

With continuous development of communications technologies, to meet requirements of different services, a data analysis network element is introduced into the 5th generation (5G) mobile communications system. The data analysis network element can perform big data analysis on related service data. However, how to enable the data analysis network element to obtain service data becomes a key problem. No method for obtaining service data by the data analysis network element is defined currently. Therefore, a method for obtaining service data is urgently needed.

SUMMARY

This application provides a method and apparatus for obtaining service data by a data analysis network element.

According to a first aspect, this application provides a method for obtaining service data, where the method includes:

obtaining, by a data analysis network element, service data from a service network element, where the service data includes at least one or a combination of the following: a service identifier, first data, and second data, where the service identifier is used to identify a service type of the service data, the first data includes a terminal identifier, and the second data includes a feature value list obtained through normalization processing.

By using the foregoing method, the data analysis network element may obtain the service data, so that the data analysis network element can perform big data analysis on the obtained service data, thereby implementing differentiated service assurance.

In a possible design, before the obtaining, by a data analysis network element, service data from the service network element, the method includes: receiving, by the data analysis network element, a service identifier allocation request from the service network element; obtaining, by the data analysis network element, the service identifier; and sending, by the data analysis network element, a service identifier allocation response to the service network element, where the service identifier allocation response includes the service identifier.

In a possible design, the receiving, by the data analysis network element, a service identifier allocation request from the service network element includes: receiving, by the data analysis network element, the service identifier allocation request from the service network element by using a network exposure network element; and the sending, by the data analysis network element, a service identifier allocation response to the service network element includes: sending, by the data analysis network element, the service identifier allocation response to the service network element by using the network exposure network element, where the service identifier allocation response includes the service identifier.

In a possible design, a method for obtaining, by the data analysis network element, the service data from the service network element may include: sending, by the data analysis network element, a first data request to the service network element, where the first data request includes the service identifier corresponding to the service data; and receiving the service data corresponding to the service identifier from the service network element.

By using the foregoing method, the data analysis network element can successfully obtain the service data, and can further perform big data analysis on the service data.

In a possible design, when obtaining the service data from the service network element, the data analysis network element may receive the service data actively sent, e.g., without being requested, by the service network element to the data analysis network element. In this way, the data analysis network element can successfully obtain the service data, and can further perform big data analysis on the service data.

In a possible design, a method for obtaining, by the data analysis network element, the service data from the service network element may include: sending, by the data analysis network element, a second data request to a network exposure network element, where the second data request includes the service identifier corresponding to the service data; and receiving the service data corresponding to the service identifier from the network exposure network element, where the service data is from the service network element.

By using the foregoing method, the data analysis network element can successfully obtain the service data, and can further perform big data analysis on the service data.

In a possible design, when obtaining the service data from the service network element, the data analysis network element may receive the service data actively sent by the network exposure network element to the data analysis network element, where the service data is from the service network element. Specifically, after the service network element sends the service data to the network exposure network element, the network exposure network element sends the service data to the data analysis network element.

By using the foregoing method, the data analysis network element can successfully obtain the service data, and can further perform big data analysis on the service data.

In a possible design, the terminal identifier includes at least one or a combination of the following: a terminal IP, a terminal port number, a service server IP, a service server port number, a transmission protocol, an international mobile subscriber identity (IMSI), an international mobile equipment identity (IMEI), and a mobile subscriber international integrated services digital network number (MSISDN).

In a possible design, the first data further includes at least one or a combination of the following: a service start time, a service end time, service experience information, and a communication mode.

In a possible design, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In a possible design, the service identifier includes at least one or a combination of the following: a public land mobile network identifier (PLMN ID), a service identifier, and an analytic identifier.

According to a second aspect, this application provides a method for obtaining service data, where the method includes:

sending, by a service network element, service data to a data analysis network element, where the service data includes at least one or a combination of the following: a service identifier, first data, and second data, where the service identifier is used to identify a service type corresponding to the service data, the first data includes a terminal identifier, and the second data includes a feature value list obtained through normalization processing. In this way, the data analysis network element may obtain the service data, so that the data analysis network element can perform big data analysis on the obtained service data, thereby implementing differentiated service assurance.

In a possible design, before the sending, by a service network element, the service data to the data analysis network element, the method includes: sending, by the service network element, a service identifier allocation request to the data analysis network element; and receiving, by the service network element, a service identifier allocation response from the data analysis network element, where the service identifier allocation response includes the service identifier.

In a possible design, the sending, by the service network element, a service identifier allocation request to the data analysis network element includes: sending, by the service network element, the service identifier allocation request to the data analysis network element by using a network exposure network element; and the receiving, by the service network element, a service identifier allocation response from the data analysis network element includes: receiving, by the service network element by using the network exposure network element, the service identifier allocation response sent by the data analysis network element, where the service identifier allocation response includes the service identifier.

In a possible design, a specific method for sending, by the service network element, the service data to the data analysis network element may include: receiving, by the service network element, a data request from the data analysis network element, where the data request includes the service identifier corresponding to the service data; and sending the service data corresponding to the service identifier to the data analysis network element. In this way, the data analysis network element can successfully obtain the service data, and can further perform big data analysis on the service data.

In a possible design, the service network element sends the service network element to the data analysis network element. In this way, the service network element actively sends the service data to the data analysis network element, e.g., without being requested, so that the data analysis network element can successfully obtain the service data, and the data analysis network element can perform big data analysis on the service data.

In a possible design, a specific method for sending, by the service network element, the service data to the data analysis network element may include: sending, by the service network element, the service data to the data analysis network element by using a network exposure network element. In this way, the data analysis network element can successfully obtain the service data, and can further perform big data analysis on the service data.

In a possible design, the first data further includes at least one or a combination of the following: a service start time, a service end time, service experience information, and a communication mode.

In a possible design, the terminal identifier includes at least one or a combination of the following: a terminal IP, a terminal port number, a service server IP, a service server port number, a transmission protocol, an international mobile subscriber identity IMSI, an international mobile equipment identity IMEI, and a mobile subscriber international integrated services digital network number MSISDN.

In a possible design, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In a possible design, the service identifier includes at least one or a combination of the following: a PLMN ID, a service ID, and an analytic ID.

In a possible design, the service network element may be an AF of an operator, an AF of a non-operator, a terminal, or the like.

According to a third aspect, this application provides a method for obtaining service data, where the method includes:

receiving, by the network exposure network element, service data sent by the service network element; and sending the service data to the data analysis network element, where the service data includes at least one or a combination of the following: a service identifier, first data, and second data, where the service identifier is used to identify a service type corresponding to the service data, the first data includes a terminal identifier, and the second data includes a feature value list obtained through normalization processing. In this way, the data analysis network element can successfully obtain the service data, so that the data analysis network element can perform big data analysis on the obtained service data, thereby implementing differentiated service assurance.

In a possible design, the network exposure network element directly receives the service data sent by the service network element, and sends the service data to the data analysis network element. In this way, the data analysis network element can successfully obtain the service data, so that the data analysis network element can perform big data analysis on the obtained service data, thereby implementing differentiated service assurance.

In a possible design, after receiving the service data, the network exposure network element locally stores the service data, so that the network exposure network element can send the service data to the service data network element later.

In a possible design, after receiving the service data, the network exposure network element sends the service data to a database network element, so that the service data is stored in the database network element.

In a possible design, when sending the service data to the data analysis network element, the network exposure network element may directly send the service data to the data analysis network element. In this way, the network exposure network element actively sends the service data to the data analysis network element, for example, without being requested, so that the data analysis network element can perform big data analysis on the obtained service data, thereby implementing differentiated service assurance.

In a possible design, a specific method for sending, by the network exposure network element, the service data to the data analysis network element may include: receiving, by the network exposure network element, a data request from the data analysis network element, where the data request includes the service identifier corresponding to the service data; and sending the service data corresponding to the service identifier to the data analysis network element. In this way, the data analysis network element can successfully obtain the service data conforming to the data composition information, so that the data analysis network element can perform big data analysis on the obtained service data, thereby implementing differentiated service assurance.

In a possible design, before sending the service data to the data analysis network element, the network exposure network element sends a data query request to a database network element, where the data query request includes the service identifier corresponding to the service data, and receives the service data corresponding to the service identifier from the database network element. In this way, the network exposure network element can send the service data to the data analysis network element subsequently.

In a possible design, the first data further includes at least one or a combination of the following: a service start time, a service end time, service experience information, and a communication mode.

In a possible design, the terminal identifier includes at least one or a combination of the following: a terminal IP, a terminal port number, a service server IP, a service server port number, a transmission protocol, an IMSI, an IMEI, and an MSISDN.

In a possible design, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In a possible design, the service identifier includes at least one or a combination of the following: a PLMN ID, a service ID, and an analytic ID.

According to a fourth aspect, this application provides a method for obtaining service data, where the method includes:

receiving, by a database network element, service data sent by a network exposure network element, and storing the service data into the database network element, where the service data includes at least one or a combination of the following: a service identifier, first data, and second data, where the service identifier is used to identify a service type corresponding to the service data, the first data includes a terminal identifier, and the second data includes a feature value list obtained through normalization processing.

By using the foregoing method, the network exposure network element may query, from the database network element, service data required by a data analysis network element, and then the network exposure network element may send the service data to the data analysis network element, so that the data analysis network element successfully performs big data analysis on the service data, thereby implementing differentiated service assurance.

In a possible design, the terminal identifier includes at least one or a combination of the following: a terminal IP, a terminal port number, a service server IP, a service server port number, a transmission protocol, an IMSI, an IMEI, and an MSISDN.

In a possible design, the database network element receives a data query request from the network exposure network element, where the data query request includes the service identifier corresponding to the service data, and the database network element determines, in the database network element, the service data corresponding to the service identifier, and sends the service data to the network exposure network element. In this way, after receiving the service data, the network exposure network element may send the service data to the data analysis network element.

In a possible design, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In a possible design, the service identifier includes at least one or a combination of the following: a PLMN ID, a service ID, and an analytic ID.

According to a fifth aspect, this application further provides a data analysis network element. The data analysis network element has a function of implementing the behaviors of data analysis network elements in the foregoing method examples. The function may be implemented by hardware, or may be implemented by hardware by executing corresponding software. The hardware or the software includes one or more modules corresponding to the foregoing function.

In a possible design, a structure of the data analysis network element includes an obtaining unit and a sending unit, and the units can perform corresponding functions in the foregoing method examples. For details, refer to detailed descriptions in the method examples. Details are not described herein again.

In a possible design, the structure of the data analysis network element includes a communications interface, a processor, and a memory. The communications interface is configured to receive and send data, and is configured to communicate and interact with another device in a communications system. The processor is configured to support the data analysis network element in performing a corresponding function in the foregoing method. The memory is coupled to the processor, and the memory stores a program instruction and data that are necessary for the data analysis network element.

According to a sixth aspect, this application further provides a service network element. The service network element has a function of implementing the behaviors of service network elements in the foregoing method examples. The function may be implemented by hardware, or may be implemented by hardware by executing corresponding software. The hardware or the software includes one or more modules corresponding to the foregoing function.

In a possible design, a structure of the service network element includes a sending unit and a receiving unit, and the units can perform corresponding functions in the foregoing method examples. For details, refer to detailed descriptions in the method examples. Details are not described herein again.

In a possible design, the structure of the service network element includes a communications interface, a processor, and a memory. The communications interface is configured to receive and send data, and is configured to communicate and interact with another device in a communications system. The processor is configured to support the service network element in performing a corresponding function in the foregoing method. The memory is coupled to the processor, and the memory stores a program instruction and data that are necessary for the service network element.

According to a seventh aspect, this application further provides a network exposure network element. The network exposure network element has a function of implementing behaviors of network exposure network elements in the foregoing method examples. The function may be implemented by hardware, or may be implemented by hardware by executing corresponding software. The hardware or the software includes one or more modules corresponding to the foregoing functions.

In a possible design, a structure of the network exposure network element includes a receiving unit and a sending unit. The units can perform corresponding functions in the foregoing method examples. For details, refer to detailed descriptions in the method examples. Details are not described herein again.

In a possible design, the structure of the network exposure network element includes a communications interface, a processor, and a memory. The communications interface is configured to receive and send data, and is configured to communicate and interact with another device in a communications system. The processor is configured to support the network exposure network element in performing a corresponding function in the foregoing method. The memory is coupled to the processor, and the memory stores a program instruction and data that are necessary for the network exposure network element.

According to an eighth aspect, this application further provides a database network element. The database network element has a function of implementing behaviors of database network elements in the foregoing method examples. The function may be implemented by hardware, or may be implemented by hardware by executing corresponding software. The hardware or the software includes one or more modules corresponding to the foregoing function.

In a possible design, a structure of the database network element includes a receiving unit and a storage unit. The units can perform corresponding functions in the foregoing method examples. For details, refer to detailed descriptions in the method examples. Details are not described herein again.

In a possible design, the structure of the database network element includes a communications interface, a processor, and a memory. The communications interface is configured to receive and send data, and is configured to communicate and interact with another device in a communications system. The processor is configured to support the database network element in performing a corresponding function in the foregoing method. The memory is coupled to the processor, and the memory stores a program instruction and data that are necessary for the database network element.

According to a ninth aspect, this application further provides a communications system. The communications system includes data analysis network elements, service network elements, network exposure network elements, database network elements, and a plurality of other core network elements and an online charging system (OCS) that are mentioned in the foregoing designs.

According to a tenth aspect, this application further provides a computer storage medium. The computer storage medium stores a computer-executable instruction, and the computer-executable instruction is used to enable, when the computer-executable instruction is invoked by the computer, the computer to perform any one of the foregoing methods.

According to an eleventh aspect, this application further provides a computer program product including an instruction. When the computer program product runs on a computer, the computer is enabled to perform any one of the foregoing methods.

According to a twelfth aspect, this application further provides a chip. The chip is connected to a memory, and is configured to read and execute a program instruction stored in the memory, to implement any one of the foregoing methods.

DESCRIPTION OF EMBODIMENTS

Figure 1:
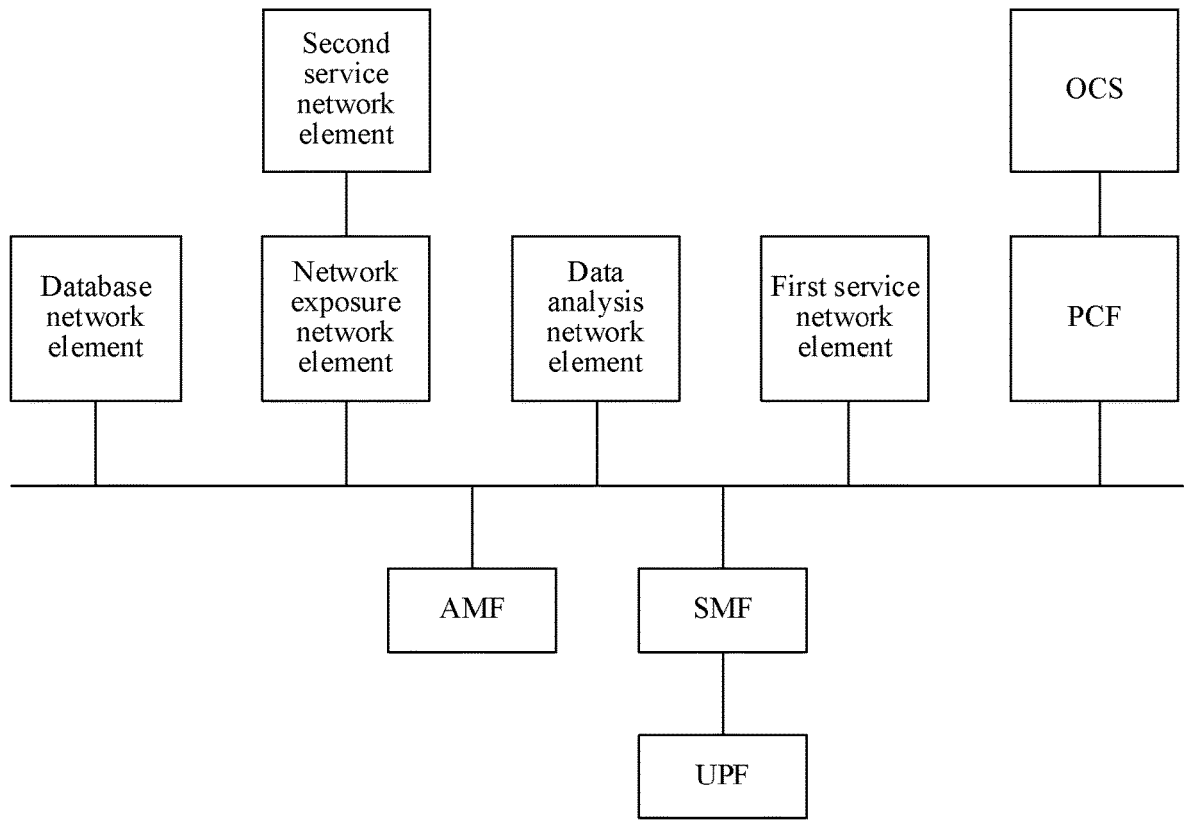
FIG. 1 is a schematic architectural diagram of a communications system according to this application.

The following further describes in detail this application with reference to the accompanying drawings.

Embodiments of this application provide a method and apparatus for obtaining service data by a data analysis network element. The method and the apparatus utilize similar problem solving principles. Therefore, for implementation of the apparatus and the method, mutual reference may be made. Details of repeated parts are not described again.

In the following, some terms in this application are described, so as to help a person skilled in the art to achieve a better understanding.

(1) A data analysis network element is a network element device that can perform big data analysis on service data of different services, and may be, but not limited to, a network data analytic function (NWDAF) network element. When performing big data analysis on any service, the data analysis network element needs to obtain terminal device data, network data, and service data that are related to the service. In the embodiments of this application, how to obtain service data is described.

(2) A service network element is a network element device that provides service data for a data analysis network element, and may be an application network element. Specifically, the application network element may be but is not limited to an application function (AF) network element of an operator, a terminal, or a third-party device, for example, an AF network element of a non-operator (which may also be referred to as an AF network element of a third party). The AF network element of the operator may be but is not limited to a service management and control server of the operator. The AF network element of the third party may be but is not limited to a service server of the third party.

(3) A network exposure network element is an intermediate network element device in a process in which a service network element provides service data for a data analysis network element. In the embodiments of the present disclosure, the network exposure network element can forward, to the data analysis network element, the service data provided by the service network element. The network exposure network element may be but is not limited to a network exposure function (NEF) network element.

(4) A database network element is a network element device having a storage function. In the embodiments of this application, the database network element may store service data. The database network element may be but is not limited to a unified data repository (UDR) network element.

(5) A terminal in the present disclosure, also referred to as user equipment (UE), is a device providing data connectivity for a user, such as a handheld device, an in-vehicle device, a wearable device, a computing device, or a mobile station (MS) having a wireless connection function, another processing device connected to a wireless modem, or a mobile terminal communicating with one or more core networks by using an access network.

(6) In the description of this application, words such as "first" and "second" are merely intended for purposes of description, and should not be understood as indicating or implying relative importance or a sequence.

To further describe the technical solutions in the embodiments of this application, the method for obtaining service data and the apparatus provided in the embodiments of this application are described below in detail with reference to the accompanying drawings.

FIG. 1 shows a possible architecture of a communications system to which a method for obtaining service data provided in an embodiment of this application is applicable. The architecture of the communications system includes a plurality of network elements in a core network and an online charging system (OCS).

The network elements in the core network include an access and mobility management function (AMF) network element, a session management function (SMF) network element, and a policy control function (PCF) network element, a network exposure network element, a first service network element, a second service network element, a user plane function (UPF) network element, a data analysis network element, and a database network element. The foregoing network elements are described in detail as follows.

The AMF network element may be configured to be responsible for registration, mobility management, a tracking area update procedure, and the like of a terminal device.

The SMF network element may be configured to be responsible for session management (including session establishment, modification, and release) of the terminal device, selection and reselection of the UPF network element, and IP address allocation, quality of service (QoS) control, and the like of the terminal device.

The PCF network element may be configured to be responsible for control and decision of a policy, and providing functions such as detection, gating, and QoS based on a service data flow and an application, and flow-based charging control.

The network exposure network element may be an NEF network element, and may be responsible for transferring information between the data analysis network element, the database network element, and the second service network element, and storing information obtained from the database network element or the second service network element, for example, storing service data.

Both the first service network element and the second service network element are service network elements, and may be configured to provide service data for the data analysis network element. The first service network element may be an AF network element of the operator, and can send service data to the data analysis network element. The second service network element may be an AF network element of the non-operator, a terminal, or the like, and may send service data to the data analysis network element by using the network exposure network element.

The UPF network element may be configured to forward user plane data of the terminal device. Main functions include routing and forwarding a data packet, a mobility anchor, an uplink classifier to support a service flow in being routed to a data network, a branch point to support a multi-homing packet data unit (PDU) session, and the like.

The data analysis network element may be an NWDAF network element, and may be configured to analyze data (for example, service data). Specifically, service data on a network slice may be analyzed.

The database network element may be a UDR, and may be configured to store data (for example, store service data).

The foregoing network elements in the core network may be network elements implemented on dedicated hardware, or may be software instances running on dedicated hardware, or may be instances of virtualization functions on an appropriate platform. For example, the foregoing virtualization platform may be a cloud platform.

The OCS may be configured to: implement an online charging function, and cooperate with another charging network element (a request device triggering a session/event-based online charging event) to perform real-time traffic control.

It should be noted that the architecture of the communications system shown in FIG. 1 is not limited to the network elements shown in the figure, and may further include another device that is not shown in the figure, for example, a terminal, and an access network device.

In the architecture of the communications system shown in FIG. 1, the network elements communicate and interact with each other by using corresponding interfaces. Optionally, the foregoing network elements may also be referred to as functional entities, and this is not limited in this application.

It should be noted that the communications system shown in FIG. 1 does not constitute a limitation on the communications systems to which the embodiments of this application is applicable. Therefore, the methods provided in this application may be further applicable to a 2nd generation (2G) mobile communications system, for example, a global system for mobile communications (GSM) or a general packet radio service (GPRS) system. In addition, the method may also be applicable to a 3rd generation (3G) mobile communications system, for example, a universal mobile telecommunications system (UMTS), and may be further applicable to a 4th generation (4G) mobile communications system, and applicable to a 5th generation (5G) communications system or various mobile communications networks in the future.

In this embodiment of this application, the data analysis network element in the architecture of the communications system may analyze service data of different services, to ensure that service requirements are met, obtain policy information of the different services experienced by a user, and implement differentiated service assurance. Therefore, to implement the foregoing functions of the data analysis network element, the data analysis network element first needs to be enabled to obtain service data of any service. Specifically, the service data that needs to be analyzed by the data analysis network element is provided by the service network element. In practice, a part of initial service data in the service network element can be understood by the data analysis network element, and the other part of data cannot be understood by the data analysis network element. Therefore, to accurately perform big data analysis on a service, the data analysis network element obtains the service data from the service network element by using a preset northbound interface, so that the data analysis network element can accurately complete data analysis on the service. The data analysis network element obtains the service data from the service network element in a plurality of manners. The following describes, by using the following several specific embodiments, in detail the methods for obtaining service data.

Figure 2:
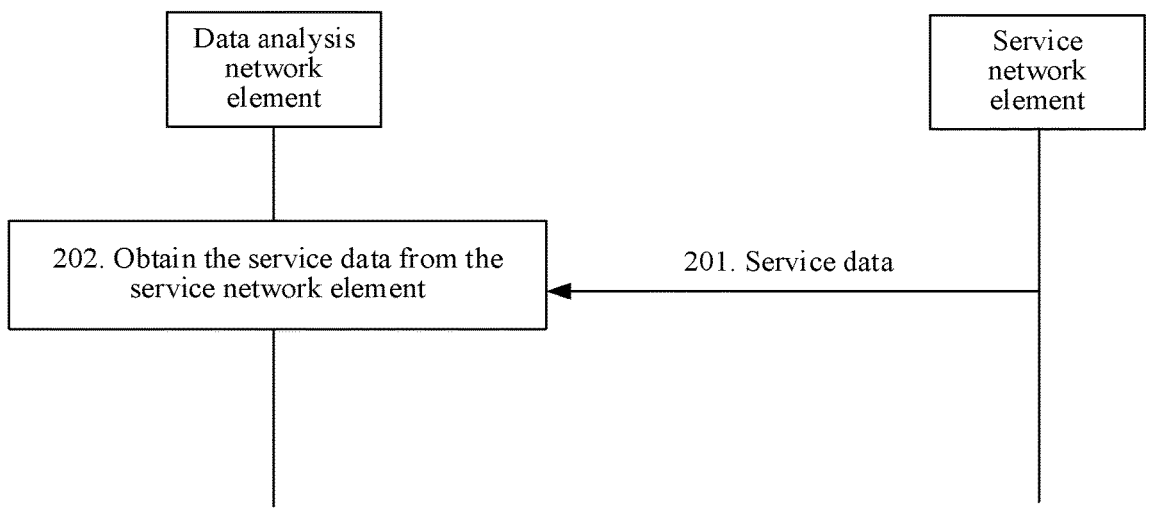
FIG. 2 is a flowchart of a method for obtaining service data according to this application.

A method for obtaining service data provided in an embodiment of this application is applicable to the communications system shown in FIG. 1. Referring to FIG. 2, a specific procedure of the method includes the following steps:

Step 201: A service network element sends service data to a data analysis network element.

Step 202: The data analysis network element obtains the service data from the service network element.

The service data includes at least one or a combination of the following: a service identifier, first data, and second data, where the service identifier is used to identify a service type corresponding to the service data. The first data includes a terminal identifier, and the second data includes a feature value list obtained through normalization processing. Optionally, the data analysis network element may identify a specific service by using the service type, and design a service identification model based on the service type.

In an optional implementation, the service identifier may include at least one or a combination of the following: a public land mobile network identifier (PLMN ID), a service identifier (Service ID), and an analytic identifier. The PLMN ID is used to indicate a network in which a current service is located. The service ID is allocated by the data analysis network element to the service. The analytic ID is used to indicate one-time big data analysis of the data analysis network element. For example, when training a service identification model for a service corresponding to the service ID, the data analysis network element allocates an analytic ID to output of the service identification model.

In an optional implementation, the terminal identifier includes at least one or a combination of the following: a terminal Internet protocol (IP), a terminal port number, a service server IP, a service server port number, a transmission protocol, an IMSI, an IMEI, and an MSISDN. Optionally, the service server is the service network element.

In an optional implementation, the first data may further include at least one of a service start time, a service end time, service experience information, and a communication mode. The service experience information may be but is not limited to a mean opinion score (MOS) of service experience. Optionally, the data analysis network element may analyze, by using the service experience information, a key factor that affects the service experience, and generate a key QoS parameter value of a service based on the service experience information, to implement differentiated service assurance.

In an optional implementation, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In practice, initial service data in the service network element may include at least one of a service identifier and two parts of data. A first part of data is data of a known data type, and a second part of data is data of an unknown data type. In addition, the data analysis network element can read only the first part of data, and cannot read the second part of data. For example, the first part of data may include a terminal identifier. The data analysis network element may understand the first part of the data. However, for the second part of data, different service types correspond to different data. For example, for a voice over long term evolution (VoLTE) service, the service network element provides voice encoding and encoding rate data. For another example, for a payment service, the service network element provides data such as payment location information. The second part of data provided by the service network element cannot be understood by the data analysis network element. Therefore, big data analysis cannot be directly performed.

Based on the foregoing analysis, the data analysis network element may determine data composition information corresponding to the service data, to obtain the service data that is from the service network element and that conforms to the data composition information. Alternatively, the service network element provides, based on agreed data composition information, service data conforming to the data composition information for the data analysis network element. The data composition information may be used to indicate a type of composition data in the service data. Specifically, the data composition information may include at least one or a combination of the following: the service identifier, a first data requirement, and a second data requirement. The first data requirement may include a terminal identifier data type, and optionally, may further include at least one of a service start time, a service end time, or a data type in service experience information, and the second data requirement includes a data type of feature data obtained through normalization processing. In this way, the data analysis network element can obtain all understandable service data, so that the data analysis network element can accurately perform big data analysis.

In an optional implementation, after determining the data composition information, the data analysis network element may send the data composition information to the service network element. Specifically, the data analysis network element may send the data composition information to the service network element in the following two manners:

a1. The data analysis network element directly sends the data composition information to the service network element.

a2. The data analysis network element sends the data composition information to the service network element by using a network exposure network element. Specifically, the data analysis network element first sends the data composition information to the network exposure network element, and then the network exposure network element sends the data composition information to the service network element.

Optionally, when the service network element is an application network element of an operator (for example, an AF network element of the operator), the data analysis network element usually uses the foregoing manner a1; or when the service network element is an application network element of a non-operator (for example, an AF network element of the non-operator), a terminal, or the like, the data analysis network element usually uses the foregoing manner a2.

In an optional implementation, after the service network element receives the data composition information sent by the data analysis network element, or after the service network element obtains the agreed data composition information, the service network element processes the initial service data into the service data conforming to the data composition information.

Figure 3:
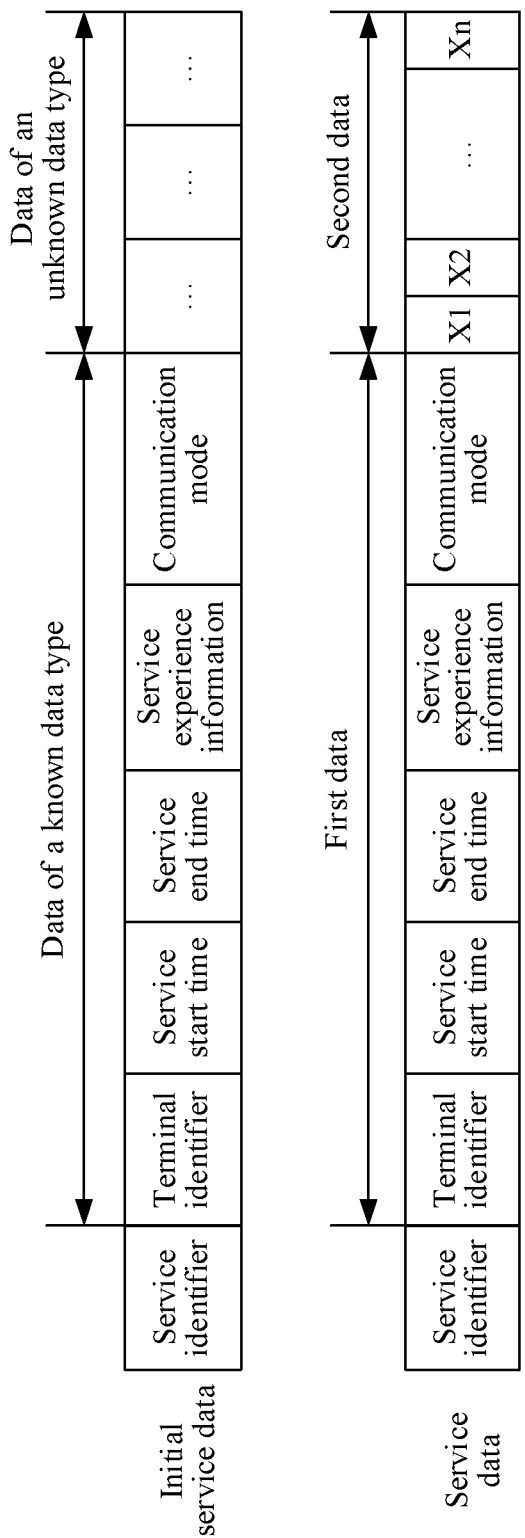
FIG. 3 is a schematic diagram of initial service data and service data according to this application.

The first data is obtained by reserving the first part of data of the known data type in the initial service data, and the second data is obtained by processing the second part of data of the unknown data type in the initial service data by the service network element. For example, FIG. 3 is a schematic diagram of specific initial service data and service data.

Specifically, because the generation of the first data in the service data is a reservation process, details are not described herein, and only a process of processing a second part of data in the initial service data into the second data in the service data is described in detail. Specifically, normalization processing may be performed on the second part of data to obtain the second data. The following uses an example in which a second part of data in initial service data is processed into the second data in a house price prediction process for description.

For example, the second part of data in the initial service data is shown in Table 1:

TABLE 1

| | | | | | | | | | | |
|---|---|---|---|---|---|---|---|---|---|---|
| Second part of data in initial service data | | | | | | | | | | |
| Number | House ID | Owner | City | Cell ID | Length | Width | Height | Price | Time | Others |
| 1 | 00001 | James | Shanghai | 001001 | 10 | 10 | 3.3 | 9.5 | 20170501 | ... |
| 2 | 00002 | Tom | Beijing | 001002 | 9 | 10 | 3.5 | 9.8 | 20170219 | ... |
| 3 | 00003 | Andrew | Nanjing | 001001 | 11 | 9 | 3.2 | 7200000 | 20170910 | ... |
| 4 | 00004 | Lucy | Hangzhou | 002005 | 8 | 5 | 3.0 | 2.4 | 20170723 | ... |
| 5 | 00005 | Tony | Nantong | 002007 | 15 | — | 3.2 | 2.1 | 20170303 | ... |
| ... | ... | ... | ... | ... | ... | ... | ... | ... | ... | ... |
| M | 09001 | Sara | Changzhou | 010954 | 14 | 15 | 3.0 | 1.9 | 20170305 | ... |

M in Table 1 is the quantity of pieces of sample data in the second part of data.

First, the service network element first denoises the second sample data, and specifically, may remove noise data such as privacy, redundancy, and abnormality. For example, in the second part of data in Table 1, an owner is privacy information of a user, 7200000 in third sample data is abnormal data, and the house width in the fifth sample data is missing. The pieces of sample data need to be removed from the second part of data, that is, a denoising processing is performed, the data obtained through the denoising processing is shown in Table 2:

TABLE 2

Data obtained through denoising processing

| Number | House ID | City | Cell ID | Length | Width | Height | Price | Time | Others |
|---|---|---|---|---|---|---|---|---|---|
| 1 | 00001 | Shanghai | 001001 | 10 | 10 | 3.3 | 9.5 | 20170501 | ... |
| 2 | 00002 | Beijing | 001002 | 9 | 10 | 3.5 | 9.8 | 20170219 | ... |
| 3 | 00004 | Hangzhou | 002005 | 8 | 5 | 3.0 | 2.4 | 20170723 | ... |
| ... | ... | ... | ... | ... | ... | ... | ... | ... | ... |
| N | 09001 | Changzhou | 010954 | 14 | 15 | 3.0 | 1.9 | 20170305 | ... |

N in Table 2 is the quantity of pieces of sample data in the data obtained through the denoising processing.

Then, the service network element performs initial feature extraction processing on the data obtained through the denoising processing. Specifically, the service network element may extract, from the data obtained through the denoising processing, a feature whose correlation degree with a big data analysis target (which refers to house price prediction herein) is greater than a first specified degree. For example, initial features obtained for the house price prediction are shown in Table 3:

TABLE 3

Initial features

| Feature ID | Feature | Description |
|---|---|---|
| 00001 | City ID | The city of a house located. |
| 00002 | Cell ID | The Cell ID of a house located |
| 00003 | Circumference of House | The circumference of the house: 2 * (Length + Width) |
| 00004 | Square of House | The area of the house: Length * Width |
| 00005 | House Height | The Height of the house. |
| ... | ... | ... |
| S | Timestamp | The time when the house is sold or bought. |

S in Table 3 represents a dimension of an initial feature.

Then, the service network element sifts the initial features, and removes a feature whose correlation degree with the big data analysis target is greater than a second specified degree, where the second specified degree is greater than the first specified degree. For example, features obtained through sifting for the house price prediction is shown in Table 4:

TABLE 4

Features obtained through sifting

| Feature ID | Feature | Description |
|---|---|---|
| 00001 | City ID | The city of a house located. |
| 00002 | Cell ID | The Cell ID of a house located |
| 00004 | House Area | The area of the house: Length * Width |
| ... | ... | ... |
| D | Timestamp | The time when the house is sold or bought. |

D in Table 4 represents a dimension of a feature obtained through sifting.

Then, based on the data obtained through the denoising processing and the features obtained through the sifting, initial feature data obtained by the service network element is shown in Table 5:

TABLE 5

Initial feature data

| | | | Feature ID | | | | |
|---|---|---|---|---|---|---|---|
| Number | House ID | Price | 00001 | 00002 | 00004 | ... | D |
| 1 | 00001 | 9.5 | 0001 | 001001 | 100 | ... | 1493568000 |
| 2 | 00002 | 9.8 | 0002 | 001002 | 90 | ... | 1484755200 |
| 3 | 00004 | 2.4 | 0005 | 002005 | 85 | ... | 1500739200 |
| ... | ... | ... | ... | ... | ... | ... | ... |
| N | 09001 | 1.9 | 0100 | 010954 | 210 | ... | 1488643200 |

Finally, the service network element performs normalization processing on the initial feature data, to obtain normalized feature data. Optionally, the service network element may use a normalization method such as a min-max (min-max) normalization method (also referred to as deviation standardization) or a Z-score normalization method. The normalization processing is mainly mapping a physical data value of each feature to a fixed data value space by using the min-max normalization method, the Z-Score normalization method, or the like. This processing facilitates improvement of model training convergence speed in a big data analysis process in one aspect, and provides a feature data transmission mode in another aspect.

For example, feature values obtained through the service network element performs the normalization processing on the initial feature data by using the min-max normalization method may be shown in Table 6.

TABLE 6

Feature values obtained through normalization processing

| | | | Feature ID | | | | |
|---|---|---|---|---|---|---|---|
| Number | House ID | Price | 00001 | 00002 | 00004 | ... | D |
| 1 | 00001 | 0.475 | 0.01 | 0.05005 | 0.20 | ... | 0.568 |
| 2 | 00002 | 0.49 | 0.02 | 0.05010 | 0.18 | ... | 0.552 |
| 3 | 00004 | 0.12 | 0.05 | 0.05025 | 0.17 | ... | 0.392 |
| ... | ... | ... | ... | ... | ... | ... | ... |
| N | 09001 | 0.095 | 1.00 | 0.54770 | 0.42 | ... | 0.432 |

By using the foregoing method, the second data is obtained, that is, the second data is the feature values obtained through the normalization processing. In this way, the data analysis network element can obtain the service data, and then the data analysis network element can accurately perform the big data analysis on the service data.

In an optional implementation, the service data may further include one or more pieces of service sample data, and each piece of service sample data may be considered as service data conforming to the data composition information.

In an optional implementation, before that the data analysis network element obtains the service data from the service network element, the method further includes the following steps: receiving, by the data analysis network element, a service identifier allocation request from the service network element; obtaining, by the data analysis network element, the service identifier; and sending, by the data analysis network element, a service identifier allocation response to the service network element, where the service identifier allocation response includes the service identifier. In this way, the service data sent by the service network element to the data analysis network element may include the service identifier, so that the data analysis network element identifies the service type corresponding to the service data.

In an optional implementation, when receiving the service identifier allocation request from the service network element, the data analysis network element may receive the service identifier allocation request from the service network element by using a network exposure network element, and when sending the service identifier allocation response to the service network element, the data analysis network element may send the service identifier allocation response to the service network element by using the network exposure network element, where the service identifier allocation response includes the service identifier.

In an optional implementation, when receiving the service identifier allocation request from the service network element, the data analysis network element may receive the service identifier allocation request sent by the service network element, and the data analysis network element sends the service identifier allocation response to the service network element.

In an optional implementation, the service identifier may be negotiated by the service network element with the data analysis network element in advance and configured locally in the service network element, or may be configured in the service network element by a policy control function network element. The service network element may obtain the configured service identifier.

In an optional implementation, when the data analysis network element obtains the service data that is from the service network element and that conforms to the data composition information, there may be the following four cases:

b1. The data analysis network element receives the service data actively sent, e.g., without being requested, by the service network element. The service data may be carried in a data collection management notification that is sent by the service network element to the data analysis network element. In an optional implementation, after receiving the service data sent by the service network element, the data analysis network element sends a response message to the service network element, to notify the service network element of a receiving result. Specifically, the response message may be carried in a data collection management notification response that is sent by the data analysis network element to the service network element.

b2. The data analysis network element sends a first data request to the service network element, where the first data request includes the service identifier corresponding to the service data. Then, the data analysis network element receives the service data corresponding to the service identifier from the service network element. The first data request may be carried in a data collection management request that is sent by the data analysis network element to the service network element, and the service data may be carried in a data collection management response that is sent by the service network element to the data analysis network element.

b3. The service network element sends the service data to the network exposure network element, and after receiving the service data, the network exposure network element sends the service data to the data analysis network element. The service data sent by the service network element to the network exposure network element may be carried in a data collection management request that is sent by the service network element to the network exposure network element, and the service data sent by the network exposure network element to the data analysis network element may be carried in a data collection management notification (Nnef_Data Collection Management_Notify) that is sent by the network exposure network element to the data analysis network element.

In an optional implementation, after receiving the data collection management request sent by the service network element, the network exposure network element may verify whether the data collection management request is valid, and the network exposure network element performs a subsequent procedure after determining that the data collection management request is valid.

In an optional implementation, after receiving the service data sent by the network exposure network element, the data analysis network element sends a response message to the service network element, to notify the network exposure network element of a receiving result; and after receiving the response message sent by the data analysis network element, the service network element sends a response message to the service network element, to notify the service network element of a data management result, where the response message sent by the network exposure network element to the service network element may be carried in a data collection management response that is sent by the network exposure network element to the service network element.

b4. The service network element sends the service data to the network exposure network element, and then the data analysis network element sends a second data request to the network exposure network element, where the second data request includes the service identifier corresponding to the service data. Then, the data analysis network element receives the service data corresponding to the service identifier from the network exposure network element. The second data request may be carried in a data collection management request (Nnef_Data Collection Management_Fetch Request) that is sent by the data analysis network element to the network exposure network element, and the service data received by the data analysis network element from the network exposure network element may be carried in a data collection management response (Nnef_Data Collection Management_Fetch Response) that is sent by the network exposure network element to the data analysis network element.

Optionally, in the case b4, after the network exposure network element receives the service data sent by the service network element, the network exposure network element may have the following two processing manners:

c1. The network exposure network element locally stores the service data.

c2. The network exposure network element sends the service data to a database network element, so that the database network element stores the service data into the database network element. The service data sent by the network exposure network element to the database network element may be carried in a data update message (Nudr_UDM_Update) that is sent by the network exposure network element to the database network element. Specifically, after receiving the service data, the database network element stores the service data into the database network element, that is, updates data. In an optional implementation, after completing storage of the service data, the database network element sends a response message to the network exposure network element. The response message may be carried in a data update response (Nudr_UDM_Update Response) that is sent by the database network element to the network exposure network element.

Therefore, in b4, in an optional implementation, after receiving the second data request and before sending the service data to the data analysis network element, the network exposure network element may further determine whether the network exposure network element stores the service data corresponding to the service identifier. If the network exposure network element determines that the network exposure network element stores the service data, the network exposure network element directly sends the service data to the data analysis network element. If the network exposure network element determines that the network exposure network element does not store the service data, the network exposure network element sends a data query request to the database network element, where the data query request includes the service identifier corresponding to the service data; and receives the service data corresponding to the service identifier from the database network element. Then, the network exposure network element sends the service data to the data analysis network element. The data query request may be carried in a query message (Nudr_UDM_Query) that is sent by the network exposure network element to the database network element. The service data sent by the database network element to the network exposure network element may be carried in a query response (Nudr_UDM_Query Response) that is sent by the database network element to the network exposure network element.

Optionally, in the foregoing cases b1 and b2, the service network element may be an application network element of an operator (for example, an AF network element of the operator), and in the foregoing cases b3 and b4, the service network element may be an application network element of a non-operator (for example, an AF network element of the non-operator), a terminal, or the like.

By using the method for obtaining service data provided in this embodiment of this application, the data analysis network element obtains the service data that is from the service network element and that conforms to the data composition information. In this way, the data analysis network element can perform the big data analysis on the obtained service data, thereby implementing differentiated service assurance.

Figure 4:
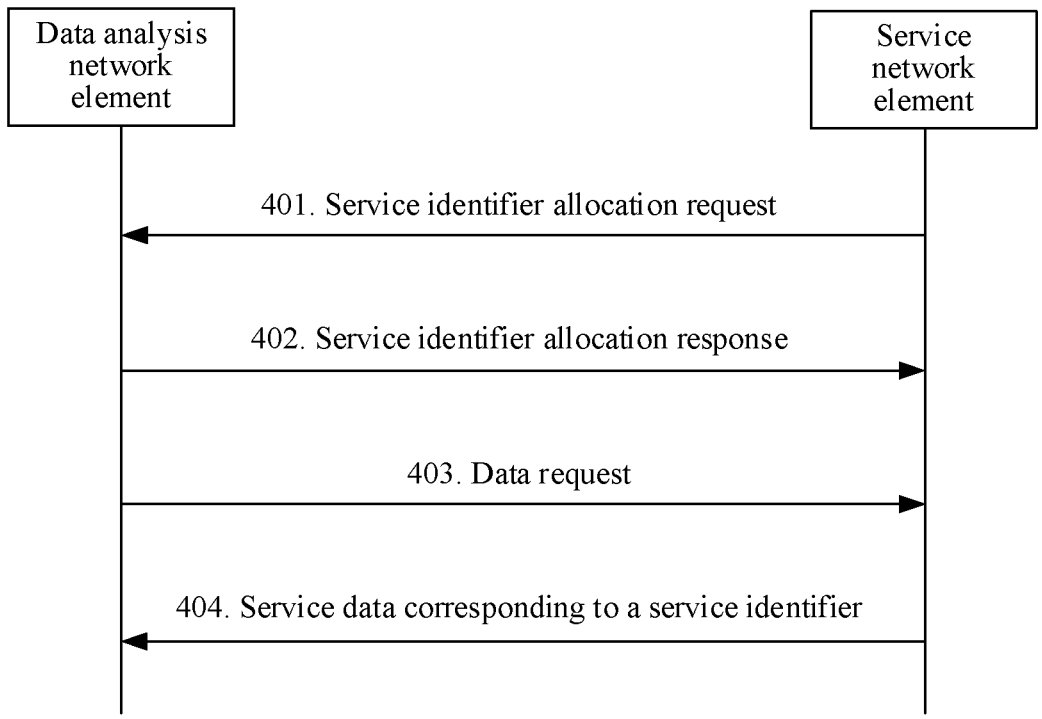
FIG. 4 is a flowchart of an example of a method for obtaining service data according to this application.

Based on the foregoing embodiment, an embodiment of this application further provides an example of a method for obtaining service data, and the method is applicable to the communications system shown in FIG. 1. In this embodiment, a data analysis network element directly exchanges information with a service network element. Referring to FIG. 4, a specific procedure of the example includes the following steps.

Step 401: The data analysis network element receives a service identifier allocation request from the service network element.

In step 401, the service network element sends the service identifier allocation request to the data analysis network element, for example, without being requested.

Step 402: The data analysis network element sends a service identifier allocation response to the service network element, where the service identifier allocation response includes the service identifier.

Step 403: The data analysis network element sends a data request to the service network element, where the data request includes the service identifier corresponding to the service data.

Specifically, the data request in step 403 is the same as the first data request in the embodiment shown in FIG. 2.

Step 404: The service network element sends the service data corresponding to the service identifier to the data analysis network element.

For a specific description of the service data, reference is made to a related description in the embodiment shown in FIG. 2, and details are not described herein again.

In this embodiment, the service network element may be an application network element of an operator (for example, an AF network element of the operator).

By using the method for obtaining service data provided in this embodiment of this application, the data analysis network element may obtain the service data from the service network element. In this way, the data analysis network element can perform big data analysis on the obtained service data, thereby implementing differentiated service assurance.

Figure 5:
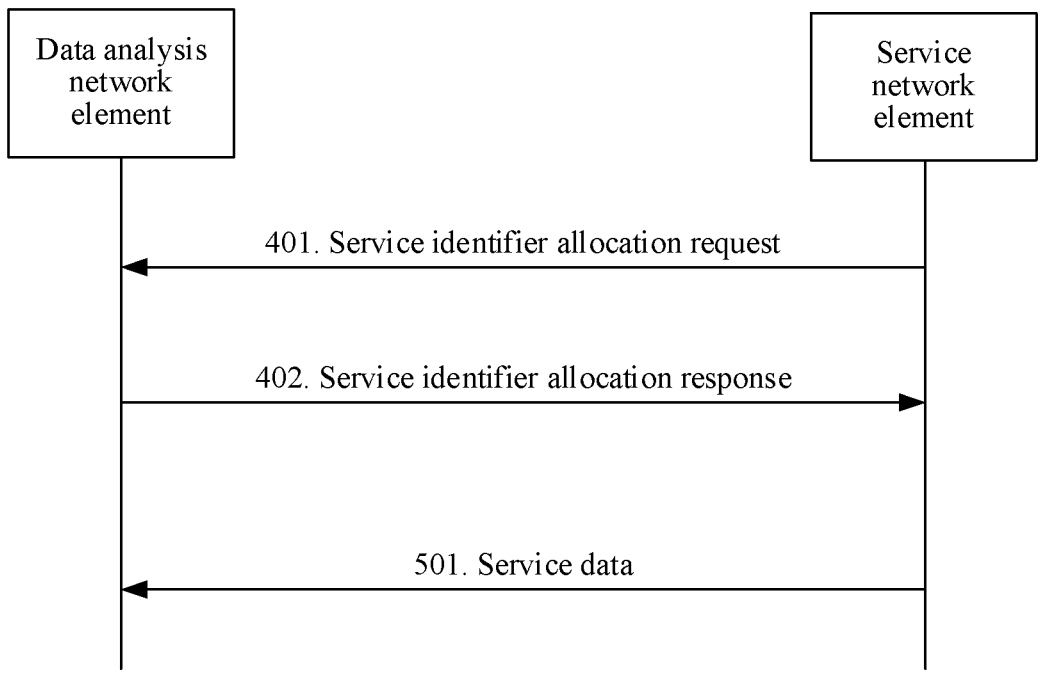
FIG. 5 is a flowchart of an example of another method for obtaining service data according to this application.

Based on the foregoing embodiment, in the embodiment described in FIG. 4, after step 401 and step 402, step 501 may be directly performed. Referring to a procedure of an example of a method for obtaining service data shown in FIG. 5, step 501 is as follows: The service network element sends service data to the data analysis network element (that is, step 403 and step 404 in the figure are replaced with step 501). In step 501, the service network element actively sends the service data to the data analysis network element, for example, without being requested. By using the method for obtaining service data provided in the embodiment shown in FIG. 5, the data analysis network element can perform big data analysis on the obtained service data, thereby implementing differentiated service assurance.

Figure 6:
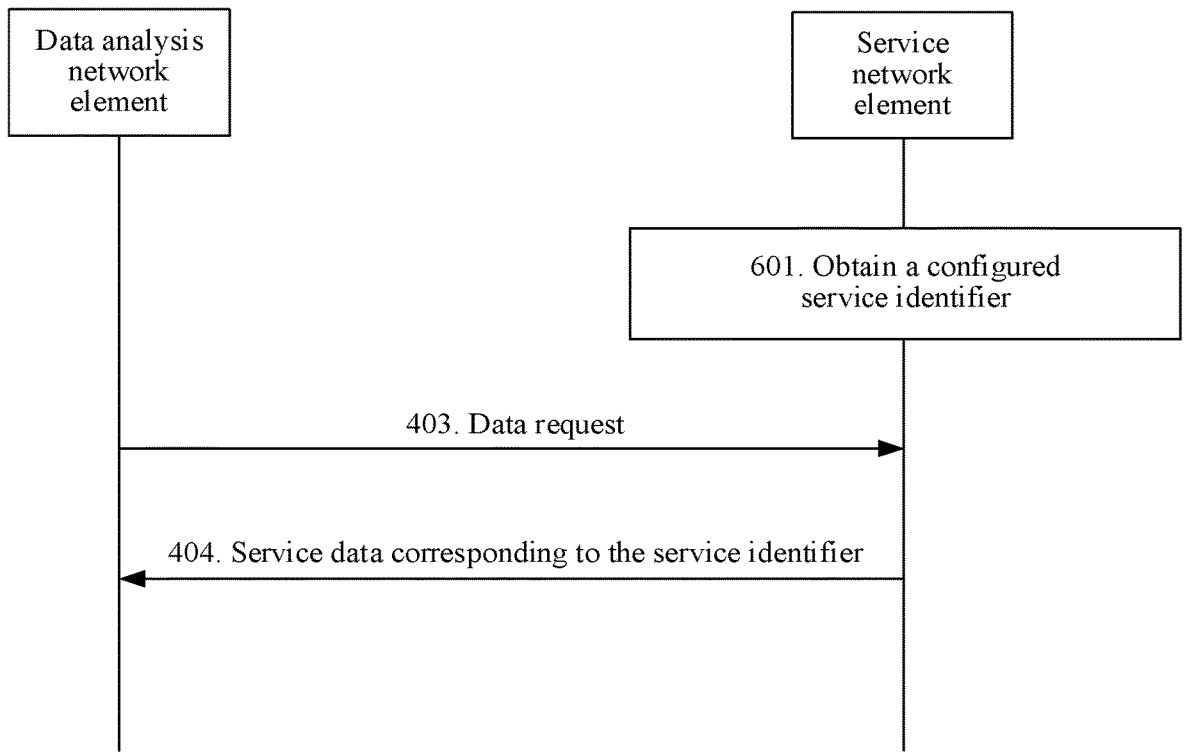
FIG. 6 is a flowchart of an example of another method for obtaining service data according to this application.

Based on the foregoing embodiment, in the embodiment shown in FIG. 4, step 401 and step 402 may be replaced with step 601. Reference is made to a procedure of an example of a method for obtaining service data shown in FIG. 6. Step 601 is as follows: A service network element obtains a configured service identifier. By using the method for obtaining service data provided in the embodiment shown in FIG. 6, a data analysis network element may obtain service data from the service network element. In this way, the data analysis network element can perform big data analysis on the obtained service data, thereby implementing differentiated service assurance.

Figure 7:
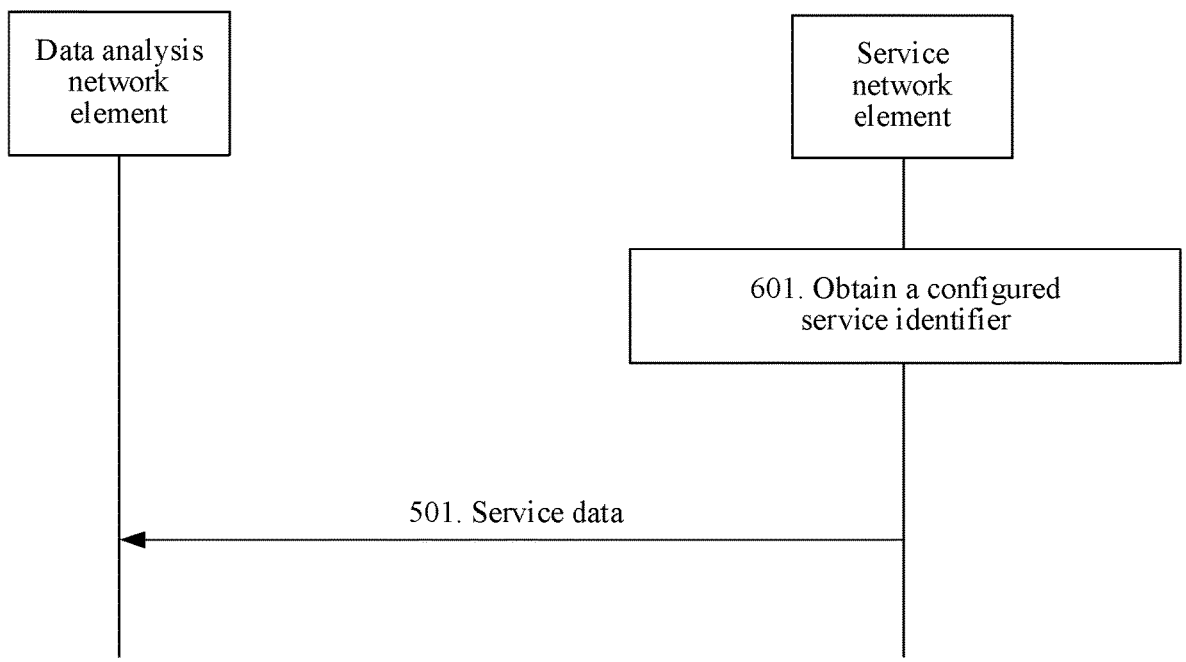
FIG. 7 is a flowchart of an example of another method for obtaining service data according to this application.

Based on the foregoing embodiments, an embodiment of this application further provides an example of a method for obtaining service data. Referring to FIG. 7, an example of the procedure includes step 601 and step 501. For a description of step 601, refer to the description of step 601 in the embodiment shown in FIG. 6. For step 501, refer to a description of step 501 in the embodiment shown in FIG. 5. Repeated content is not described herein again.

By using the method for obtaining service data provided in this embodiment of this application, a data analysis network element may obtain service data from a service network element. In this way, the data analysis network element can perform big data analysis on the obtained service data, thereby implementing differentiated service assurance.

Figure 8:
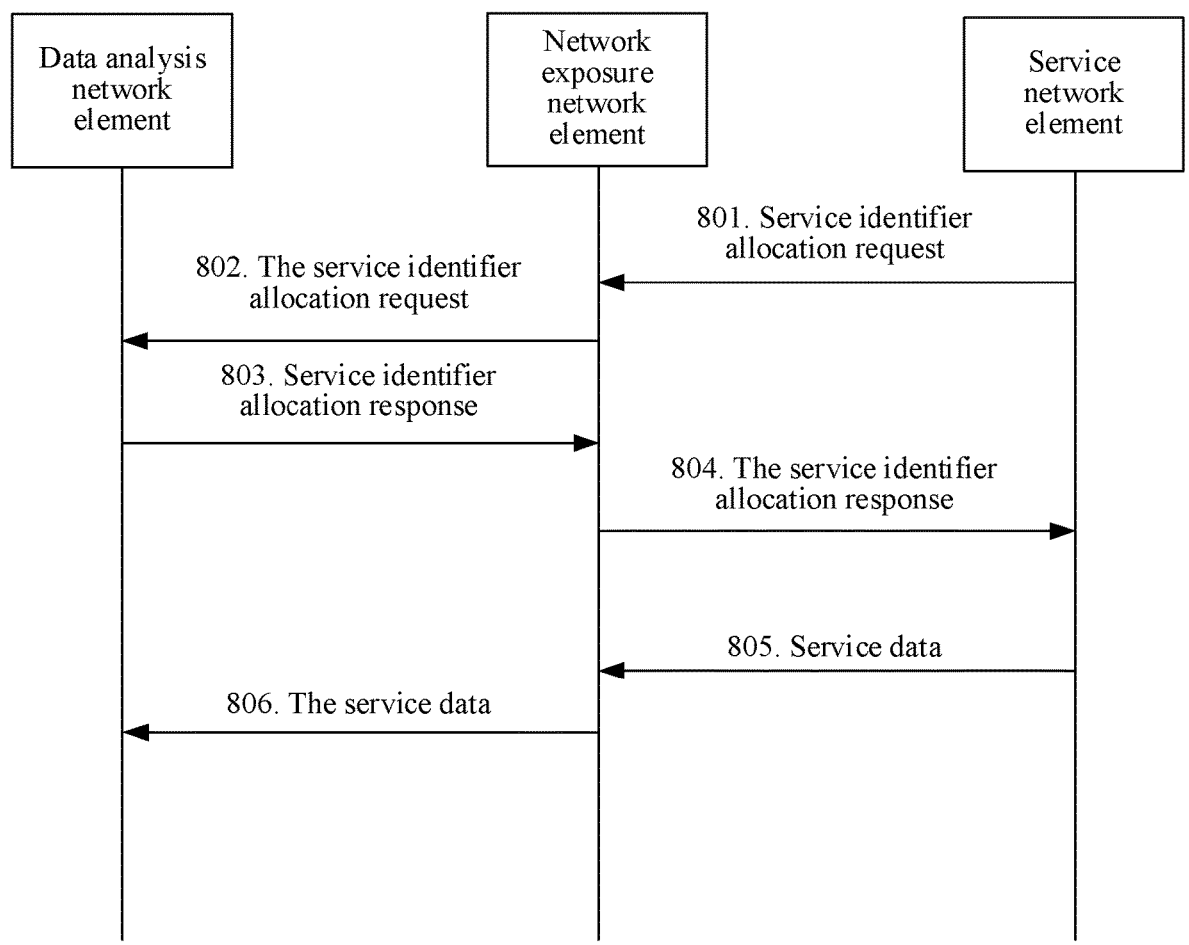
FIG. 8 is a flowchart of an example of another method for obtaining service data according to this application.

Based on the foregoing embodiments, an embodiment of this application further provides an example of a method for obtaining service data, and the method is applicable to the communications system shown in FIG. 1. In this embodiment, information is transferred between a data analysis network element and a service network element by using a network exposure network element. Referring to FIG. 8, a specific procedure of the example includes the following steps.

Step 801: The service network element sends a service identifier allocation request to the network exposure network element.

Step 802: The network exposure network element sends the service identifier allocation request to the data analysis network element.

Step 803: The data analysis network element sends a service identifier allocation response to the network exposure network element, where the service identifier allocation response includes the service identifier.

Step 804: The network exposure network element sends the service identifier allocation response to the service network element.

Step 805: The service network element sends the service data to the network exposure network element.

Step 806: The network exposure network element sends the service data to the data analysis network element.

Specifically, in step 806, the network exposure network element actively sends, e.g., without being requested, the service data to the data analysis network element.

In this embodiment, the service network element may be an application network element of a non-operator (for example, an AF network element of the non-operator), a terminal, or the like.

By using the method for obtaining service data provided in this embodiment of this application, the data analysis network element may obtain the service data from the service network element by using the network exposure network element. In this way, the data analysis network element can perform big data analysis on the obtained service data, thereby implementing differentiated service assurance.

Figure 9:
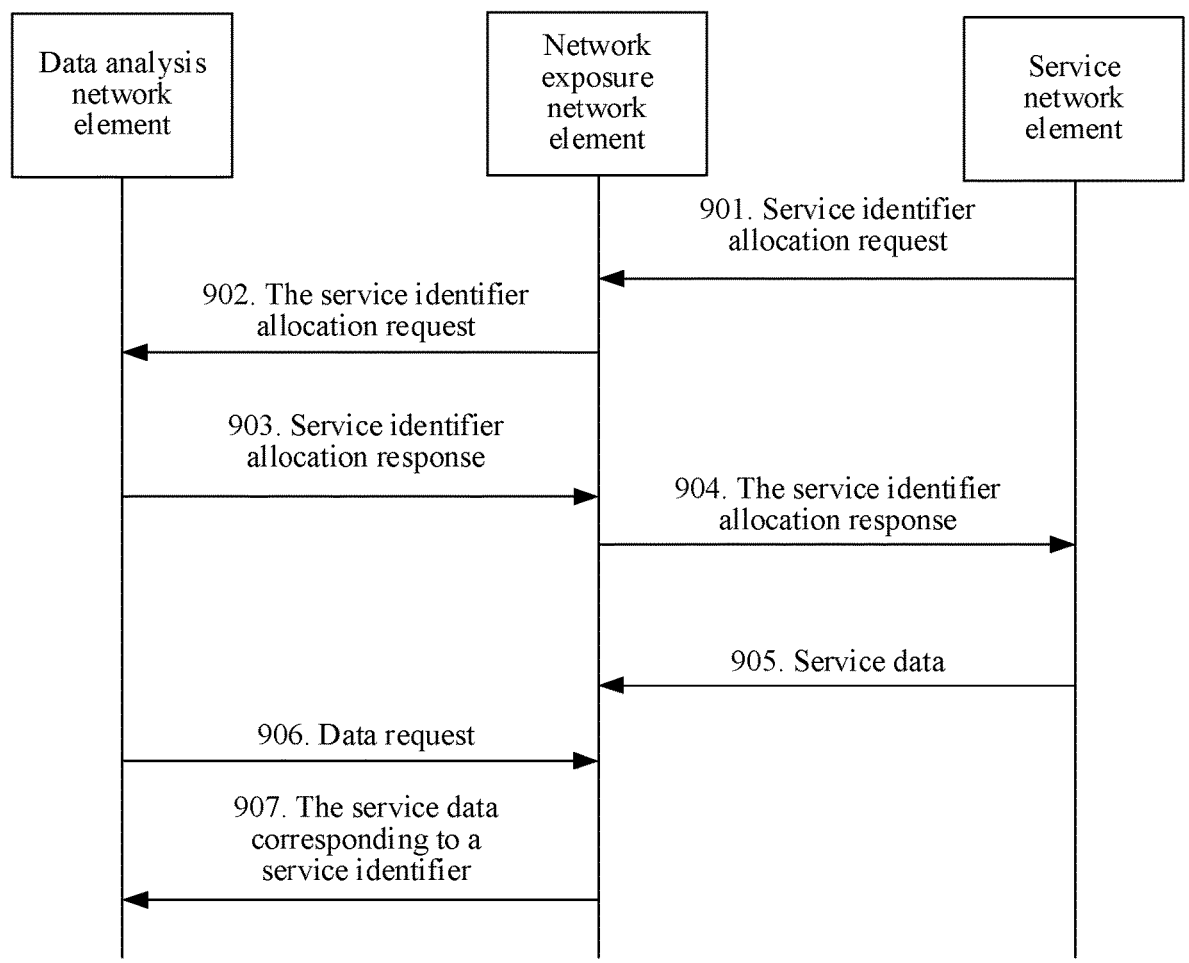
FIG. 9 is a flowchart of an example of another method for obtaining service data according to this application.

Based on the foregoing embodiments, an embodiment of this application further provides an example of a method for obtaining service data, and the method is applicable to the communications system shown in FIG. 1. In this embodiment, information is transferred between a data analysis network element and a service network element by using a network exposure network element. Referring to FIG. 9, an example of the procedure includes the following steps.

Step 901: The service network element sends a service identifier allocation request to the network exposure network element.

Step 902: The network exposure network element sends the service identifier allocation request to the data analysis network element.

Step 903: The data analysis network element sends a service identifier allocation response to the network exposure network element, where the service identifier allocation response includes the service identifier.

Step 904: The network exposure network element sends the service identifier allocation response to the service network element.

Step 905: The service network element sends the service data to the network exposure network element.

Step 906: The data analysis network element sends a data request to the network exposure network element, where the data request includes the service identifier corresponding to the service data.

Specifically, the data request in step 906 is the same as the second data request in the embodiment shown in FIG. 2.

Step 907: The network exposure network element sends the service data corresponding to the service identifier to the data analysis network element in response to the data request.

Optionally, before performing step 907, the network exposure network element determines that the network exposure network element stores the service data corresponding to the service identifier.

Step 901 to step 905 in this embodiment are the same as step 801 to step 805 in the foregoing embodiment.

In this embodiment, the service network element may be an application network element of a non-operator (for example, an AF network element of the non-operator), a terminal, or the like.

By using the method for obtaining service data provided in this embodiment of this application, the data analysis network element may obtain the service data from the service network element by using the network exposure network element. In this way, the data analysis network element can perform big data analysis on the obtained service data, thereby implementing differentiated service assurance.

Figure 10:
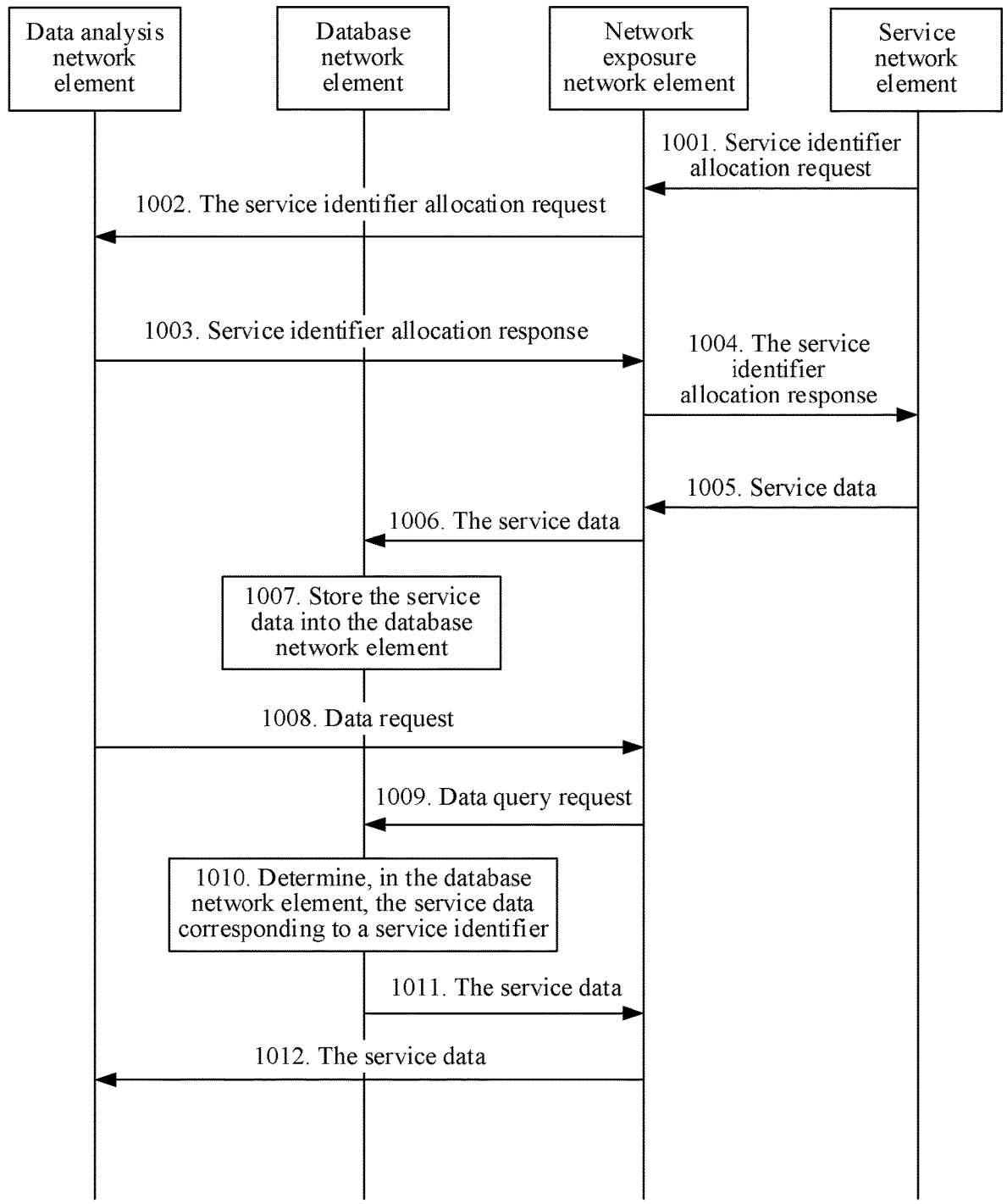
FIG. 10 is a flowchart of an example of another method for obtaining service data according to this application.

Based on the foregoing embodiments, an embodiment of this application further provides an example of a method for obtaining service data, and the method is applicable to the communications system shown in FIG. 1. In this embodiment, information is transferred between a data analysis network element and a service network element by using a network exposure network element. Referring to FIG. 10, a procedure of the example includes the following steps.

Step 1001: The service network element sends a service identifier allocation request to the network exposure network element.

Step 1002: The network exposure network element sends the service identifier allocation request to the data analysis network element.

Step 1003: The data analysis network element sends a service identifier allocation response to the network exposure network element, where the service identifier allocation response includes the service identifier.

Step 1004: The network exposure network element sends the service identifier allocation response to the service network element.

Step 1005: The service network element sends the service data to the network exposure network element.

Step 1006: The network exposure network element sends the service data to a database network element.

Step 1007: The database network element stores the service data into the database network element.

Step 1008: The data analysis network element sends a data request to the network exposure network element, where the data request includes the service identifier corresponding to the service data.

Step 1009: The network exposure network element sends a data query request to the database network element, where the data query request includes the service identifier corresponding to the service data.

Optionally, before performing step 1009, the network exposure network element determines that the network exposure network element does not store the service data corresponding to the service identifier.

Step 1010: The database network element determines, in the database network element, the service data corresponding to the service identifier.

Step 1011: The database network element sends the service data to the network exposure network element.

Step 1012: The network exposure network element sends the service data to the data analysis network element.

In this embodiment, the service network element may be an application network element of a non-operator (for example, an AF network element of the non-operator), a terminal, or the like.

By using the method for obtaining service data provided in this embodiment of this application, the data analysis network element may obtain the service data from the service network element by using the network exposure network element. In this way, the data analysis network element can perform big data analysis on the obtained service data, thereby implementing differentiated service assurance.

Figure 11:
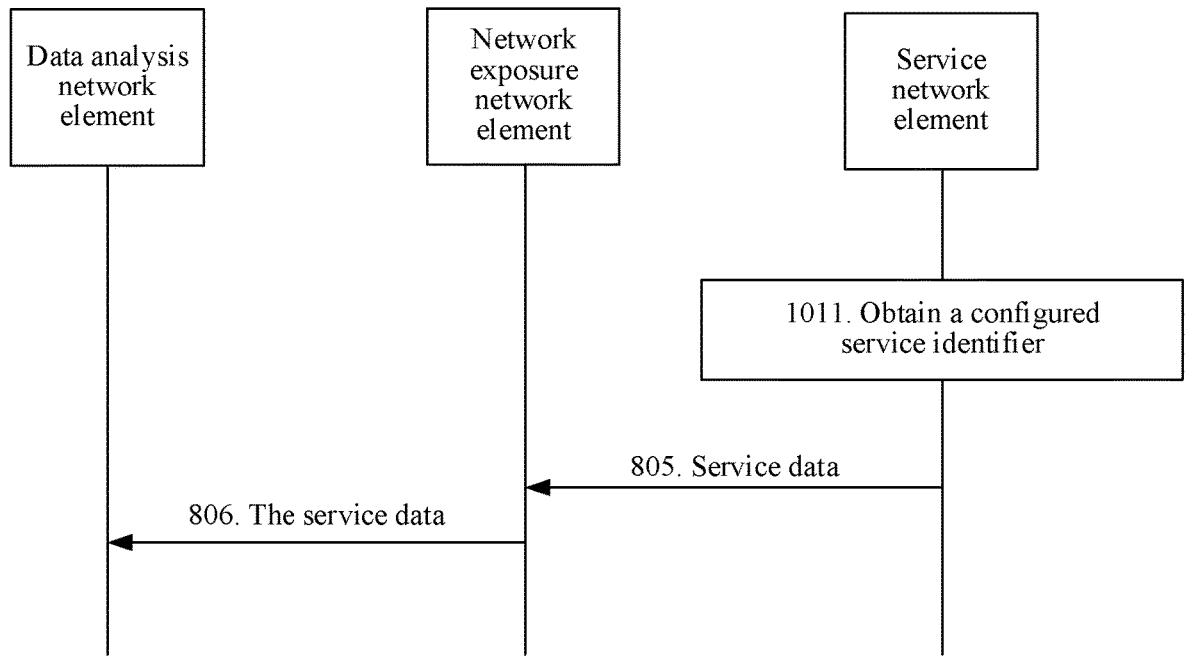
FIG. 11 is a flowchart of an example of another method for obtaining service data according to this application.

Based on the foregoing embodiments, step 801 to step 804 in the embodiment shown in FIG. 8 are replaced with step 1101: A service network element obtains a configured service identifier, that is, an example of a method for obtaining service data shown in FIG. 11. For a specific procedure, refer to FIG. 11. Details are not described herein again.

Figure 12:
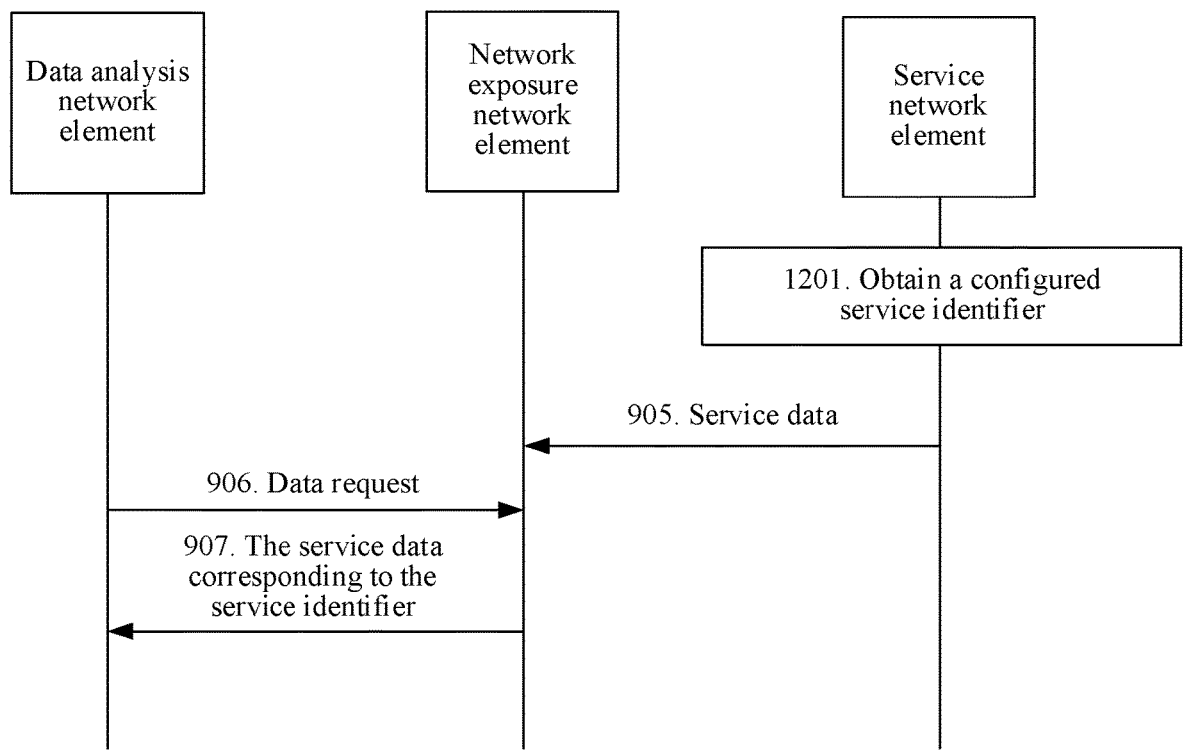
FIG. 12 is a flowchart of an example of another method for obtaining service data according to this application.

Similarly, step 901 to step 904 in the embodiment shown in FIG. 9 are replaced with step 1201: A service network element obtains a configured service identifier, that is, an example of a method for obtaining service data shown in FIG. 12. For a specific procedure, refer to FIG. 12. Details are not described herein again.

Figure 13:
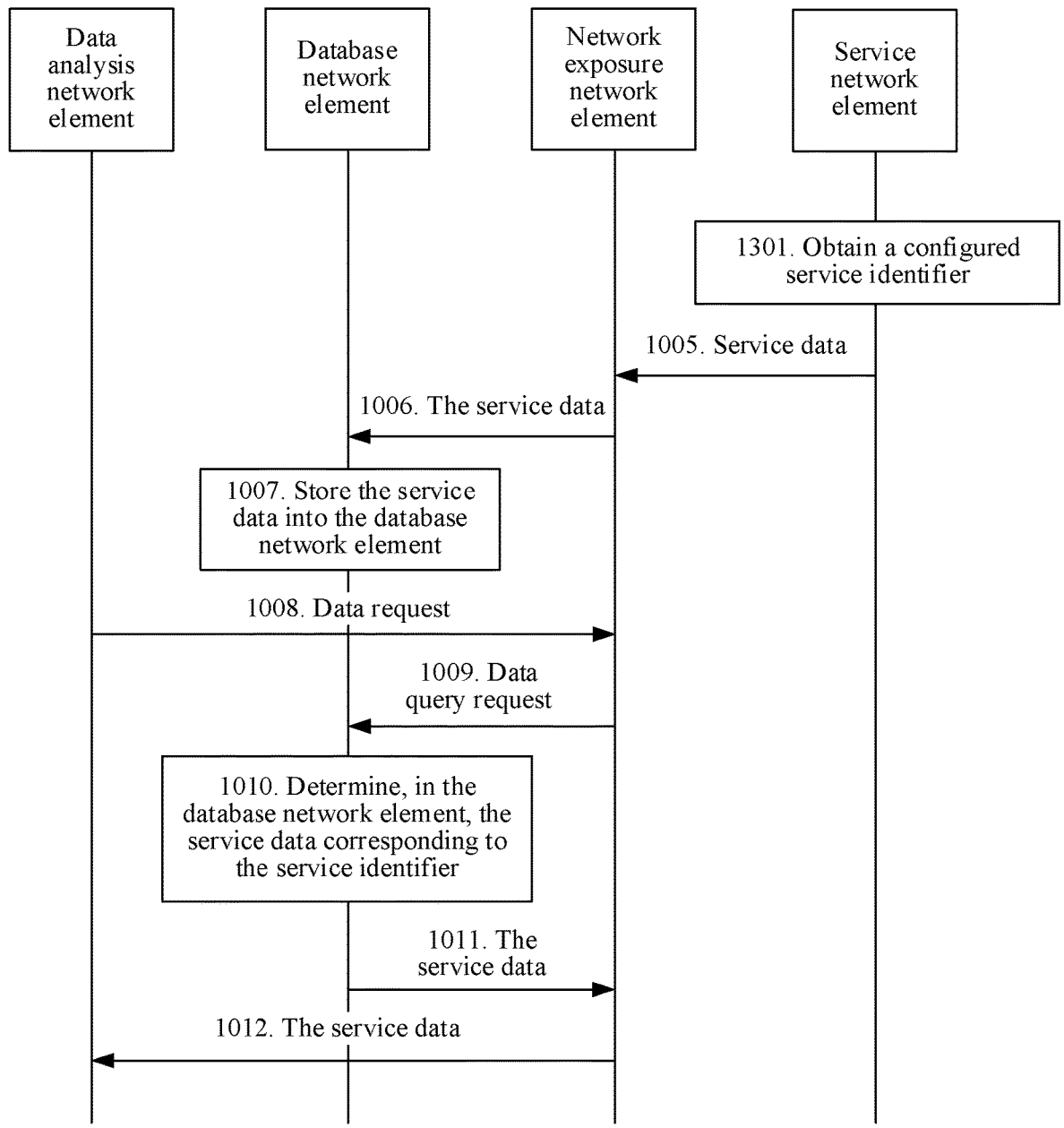
FIG. 13 is a flowchart of an example of another method for obtaining service data according to this application.

Similarly, step 1001 to step 1004 in the embodiment shown in FIG. 10 are replaced with step 1301: A service network element obtains a configured service identifier, that is, an example of a method for obtaining service data shown in FIG. 13. For a specific procedure, refer to FIG. 13. Details are not described herein again.

It should be noted that, when any two network elements interact with each other, after one network element receives data or a message sent by the other network element, the one network element may send a response to the other network element, to notify the other network element of a receiving result. Specifically, the response may be carried in signaling in an existing defined standard, or may be independent signaling. A person skilled in the art should understand this, and details are not described herein.

Figure 14:
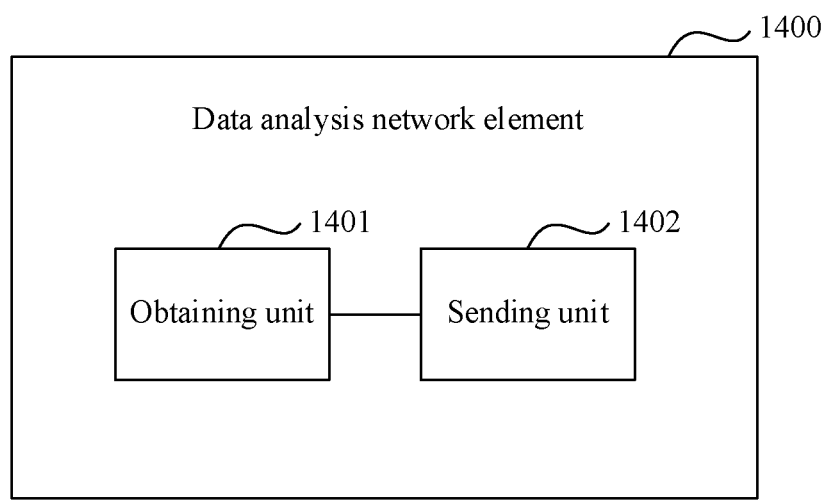
FIG. 14 is a schematic structural diagram of a data analysis network element according to this application.

Based on the foregoing embodiments, an embodiment of this application further provides a data analysis network element. The data analysis network element is applied to the data analysis network element in the communications system shown in FIG. 1, and is configured to implement the foregoing method for obtaining service data. Referring to FIG. 14, the data analysis network element 1400 includes an obtaining unit 1401 and a sending unit 1402.

The obtaining unit 1401 is configured to obtain service data from a service network element.

The service data includes at least one or a combination of the following: a service identifier, first data, and second data, where the service identifier is used to identify a service type corresponding to the service data. The first data includes a terminal identifier, and the second data includes a feature value list obtained through normalization processing.

In an optional implementation, before obtaining the service data from the service network element, the obtaining unit 1401 is further configured to: receive a service identifier allocation request from the service network element, and obtain the service identifier. The sending unit 1402 is further configured to send a service identifier allocation response to the service network element, where the service identifier allocation response includes the service identifier.

In an optional implementation, when receiving the service identifier allocation request from the service network element, the obtaining unit 1401 is configured to receive the service identifier allocation request from the service network element by using a network exposure network element, and when sending the service identifier allocation response to the service network element, the sending unit 1402 is configured to send the service identifier allocation response to the service network element by using the network exposure network element, where the service identifier allocation response includes the service identifier.

In an optional implementation, the sending unit 1402 is further configured to send a first data request to the service network element, where the first data request includes the service identifier corresponding to the service data. In an optional implementation, when obtaining the service data from the service network element, the obtaining unit 1401 is configured to receive the service data corresponding to the service identifier from the service network element after the sending unit 1402 sends the first data request to the service network element.

In an optional implementation, when obtaining the service data from the service network element, the obtaining unit 1401 is configured to receive the service data actively sent by the service network element to the data analysis network element 1400.

In an optional implementation, when obtaining the service data from the service network element, the obtaining unit 1401 is configured to receive the service data actively sent by the network exposure network element, where the service data is from the service network element, that is, is sent by the service network element to the network exposure network element.

In an optional implementation, the sending unit 1402 is further configured to send a second data request to the network exposure network element, where the second data request includes the service identifier corresponding to the service data. In an optional implementation, when obtaining the service data from the service network element, the obtaining unit 1401 is configured to receive the service data corresponding to the service identifier from the network exposure network element after the sending unit 1402 sends the second data request to the network exposure network element, where the service data is from the service network element.

In an optional implementation, the service identifier includes at least one or a combination of the following: a public land mobile network identifier PLMN ID, a service identifier Service ID, and an analytic identifier Analytic ID.

In an optional implementation, the first data further includes at least one of a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

In an optional implementation, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

The data analysis network element provided in this embodiment of this application may be configured to obtain the service data from the service network element. In this way, the data analysis network element can perform big data analysis on the obtained service data, thereby implementing differentiated service assurance.

Figure 15:
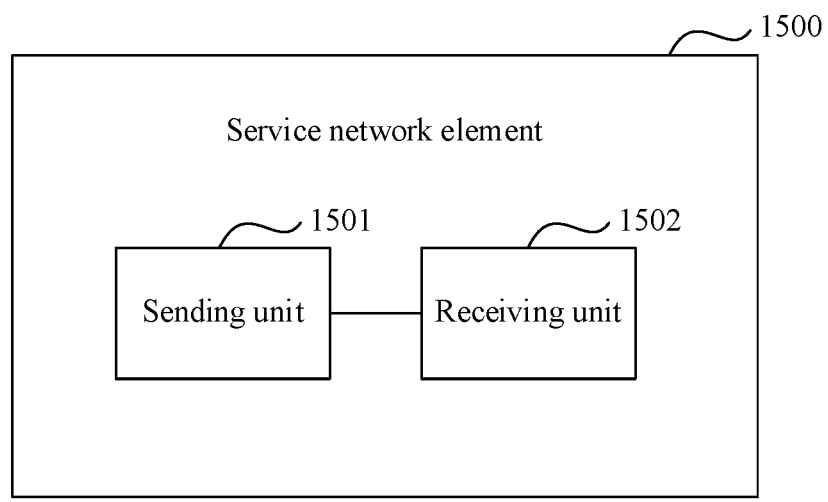
FIG. 15 is a schematic structural diagram of a service network element according to this application.

Based on the foregoing embodiments, an embodiment of this application further provides a service network element. The service network element is applied to the first service network element or the second service network element in the communications system shown in FIG. 1, and is configured to implement the foregoing method for obtaining service data. Referring to FIG. 15, the service network element 1500 includes a sending unit 1501 and a receiving unit 1502.

The sending unit 1501 is configured to send service data to a data analysis network element.

The service data includes at least one or a combination of the following: a service identifier, first data, and second data, where the service identifier is used to identify a service type corresponding to the service data. The first data includes a terminal identifier, and the second data includes a feature value list obtained through normalization processing.

In an optional implementation, before sending the service data to the data analysis network element, the sending unit 1501 is further configured to send a service identifier allocation request to the data analysis network element, and the receiving unit 1502 is configured to receive a service identifier allocation response from the data analysis network element, where the service identifier allocation response includes the service identifier.

In an optional implementation, when sending the service identifier allocation request to the data analysis network element, the sending unit 1501 is specifically configured to send the service identifier allocation request to the data analysis network element by using a network exposure network element; and when receiving the service identifier allocation response from the data analysis network element, the receiving unit 1502 is configured to receive, by using the network exposure network element, the service identifier allocation response sent by the data analysis network element, where the service identifier allocation response includes the service identifier.

In an optional implementation, the receiving unit 1502 is further configured to receive a data request from the data analysis network element, where the data request includes the service identifier of the service data. In an optional implementation, when sending the service data to the data analysis network element, the sending unit 1501 is configured to send the service data corresponding to the service identifier to the data analysis network element after the receiving unit 1502 receives the data request from the data analysis network element.

In an optional implementation, when sending the service data to the data analysis network element, the sending unit 1501 is configured to send the service data to the data analysis network element.

In an optional implementation, the service identifier includes at least one or a combination of the following: a public land mobile network identifier PLMN ID, a service identifier Service ID, and an analytic identifier Analytic ID.

In an optional implementation, when sending the service data to the data analysis network element, the sending unit 1501 is configured to send the service data to the data analysis network element by using the network exposure network element.

In an optional implementation, the first data further includes at least one of a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

Optionally, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

The service network element provided in this embodiment of this application is configured to send the service data to the data analysis network element. In this way, the data analysis network element can perform big data analysis on the obtained service data, thereby implementing differentiated service assurance.

Figure 16:
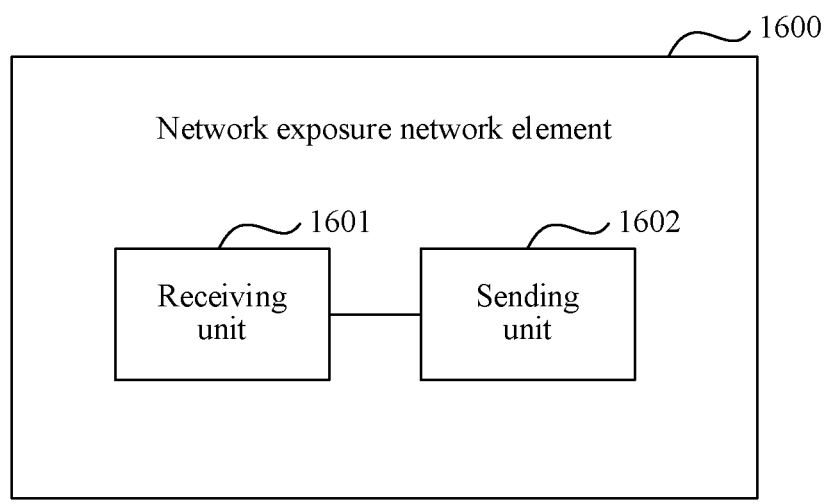
FIG. 16 is a schematic structural diagram of a network exposure network element according to this application.

Based on the foregoing embodiments, an embodiment of this application further provides a network exposure network element. The network exposure network element is applied to the network exposure network element in the communications system shown in FIG. 1. Referring to FIG. 16, the network exposure network element 1600 includes a receiving unit 1601 and a sending unit 1602.

The receiving unit 1601 is configured to receive service data sent by the service network element, where the service data includes at least one or a combination of the following: a service identifier, first data, and second data, where the service identifier is used to identify a service type corresponding to the service data, the first data includes a terminal identifier, and the second data includes a feature value list obtained through normalization processing.

The sending unit 1602 is configured to send the service data to the data analysis network element.

In an optional implementation, the sending unit 1602 is further configured to send the service data to a database network element after the receiving unit 1601 receives the service data.

In an optional implementation, the receiving unit 1601 is further configured to receive a data request from the data analysis network element, where the data request includes the service identifier corresponding to the service data. In an optional implementation, when sending the service data to the data analysis network element, the sending unit 1602 is configured to send the service data corresponding to the service identifier to the data analysis network element after the receiving unit 1601 receives the data request from the data analysis network element.

In an optional implementation, when sending the service data to the data analysis network element, the sending unit 1602 is configured to send the service data to the data analysis network element.

In an optional implementation, before sending the service data to the data analysis network element, the sending unit 1602 is further configured to send a data query request to a database network element, where the data query request includes the service identifier corresponding to the service data, and the receiving unit 1601 is further configured to receive the service data corresponding to the service identifier from the database network element.

In an optional implementation, the service identifier includes at least one or a combination of the following: a public land mobile network identifier PLMN ID, a service identifier Service ID, and an analytic identifier Analytic ID.

In an optional implementation, the first data further includes at least one of a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

Optionally, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing improves model training convergence speed in a big data analysis process in one aspect, and provides a feature data transmission mode in another aspect.

The network exposure network element provided in this embodiment of this application may be configured to send, to the data analysis network element, the service data from the service network element. In this way, the data analysis network element can perform big data analysis on the obtained service data, thereby implementing differentiated service assurance.

Figure 17:
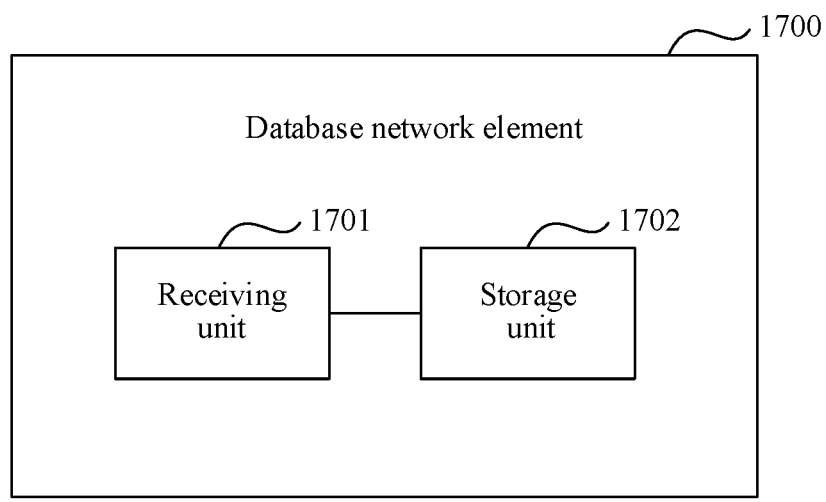
FIG. 17 is a schematic structural diagram of a database network element according to this application.

Based on the foregoing embodiments, an embodiment of this application further provides a database network element. The database network element is applied to the database network element in the communications system shown in FIG. 1. Referring to FIG. 17, the database network element 1700 includes a receiving unit 1701 and a storage unit 1702.

The receiving unit 1701 is configured to receive service data sent by a network exposure network element, where the service data includes at least one or a combination of the following: a service identifier, first data, and second data, where the service identifier is used to identify a service type corresponding to the service data, the first data includes a terminal identifier, and the second data includes a feature value list obtained through normalization processing.

The storage unit 1702 is configured to store the service data into the database network element.

In an optional implementation, the feature value list obtained through the normalization processing includes at least one feature value of a value obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

In an optional implementation, the receiving unit 1701 is further configured to receive a data query request from the network exposure network element, where the data query request includes the service identifier corresponding to the service data. The database network element 1700 further includes a determining unit, configured to determine, in the database network element 1700, the service data corresponding to the service identifier, and the database network element 1700 further includes a sending unit, configured to send the service data to the network exposure network element.

In an optional implementation, the service identifier includes at least one or a combination of the following: a public land mobile network identifier PLMN ID, a service identifier Service ID, and an analytic identifier Analytic ID.

Optionally, the first data further includes at least one of a service start time, a service end time, service experience information, and a communication mode.

The database network element provided in this embodiment of this application is configured to store the service data into the database network element after receiving the service data sent by the network exposure network element, so that the network exposure network element can send the service data to the data analysis network element subsequently after querying the service data from the database network element. In this way, the data analysis network element can obtain the service data that is from the network exposure network element and that conforms to data composition information, and can perform big data analysis on the obtained service data, thereby implementing differentiated service assurance.

It should be noted that, in embodiments of this application, the division of different units is just an example, and may correspond toy logical function division. In actual implementation, other division manners may be used. Functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 18:
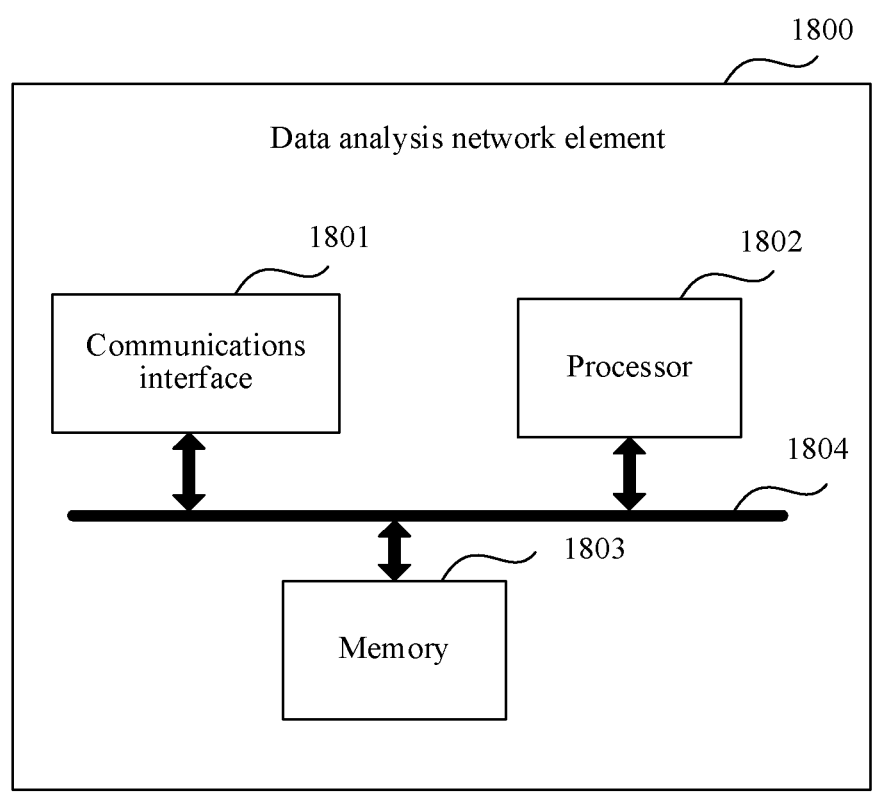
FIG. 18 is a structural diagram of a data analysis network element according to this application.

Based on the foregoing embodiments, an embodiment of this application further provides a data analysis network element. The data analysis network element is applied to the data analysis network element in the communications system shown in FIG. 1, and is configured to implement the foregoing method for obtaining service data. Referring to FIG. 18, the data analysis network element 1800 includes a communications interface 1801, a processor 1802, and a memory 1803.

The processor 1802 may be a central processing unit (CPU), a network processor (NP), or a combination of a CPU and an NP. The processor 1802 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communication interface 1801, the processor 1802, and the memory 1803 are interconnected. Optionally, the communications interface 1801, the processor 1802, and the memory 1803 are interconnected via a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

When the data analysis network element 1800 implements the method for obtaining service data provided in an embodiment of this application, the communications interface 1801 is configured to receive and send data; and the processor 1802 is configured to obtain service data from a service network element by using the communications interface, where the service data includes at least one or a combination of the following: a service identifier, first data, and second data, where the service identifier is used to identify a service type corresponding to the service data, the first data includes a terminal identifier, and the second data includes a feature value list obtained through normalization processing.

In an optional implementation, before obtaining the service data from the service network element by using the communications interface, the processor is further configured to: receive a service identifier allocation request from the service network element by using the communications interface, obtain the service identifier, and send a service identifier allocation response to the service network element by using the communications interface, where the service identifier allocation response includes the service identifier.

In an optional implementation, when receiving the service identifier allocation request from the service network element by using the communications interface, the processor is configured to: receive the service identifier allocation request from the service network element by using the communications interface and a network exposure network element. The sending a service identifier allocation response to the service network element by using the communications interface includes: sending the service identifier allocation response to the service network element by using the communications interface and the network exposure network element, where the service identifier allocation response includes the service identifier.

In an optional implementation, when obtaining the service data from the service network element by using the communications interface 1801, the processor 1802 is specifically configured to: send a first data request to the service network element by using the communications interface 1801, where the first data request includes the service identifier corresponding to the service data; and receive the service data corresponding to the service identifier from the service network element by using the communications interface 1801.

In an optional implementation, when obtaining the service data from the service network element by using the communications interface 1801, the processor 1802 is configured to receive, by using the communications interface 1801, the service data actively sent by the service network element to the data analysis network element 1800.

In an optional implementation, when obtaining the service data from the service network element by using the communications interface 1801, the processor 1802 is specifically configured to receive, by using the communications interface 1801, the service data actively sent by the network exposure network element, where the service data is from the service network element, that is, is sent by the service network element to the network exposure network element.

In an optional implementation, when obtaining the service data from the service network element by using the communications interface 1801, the processor 1802 is specifically configured to: send a second data request to the network exposure network element by using the communications interface 1801, where the second data request includes the service identifier corresponding to the service data; and receive, by using the communications interface 1801, the service data corresponding to the service identifier from the network exposure network element, where the service data is from the service network element.

In an optional implementation, the service identifier includes at least one or a combination of the following: a public land mobile network identifier PLMN ID, a service identifier Service ID, and an analytic identifier Analytic ID.

In an optional implementation, the first data further includes at least one of a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

In an optional implementation, the feature value list obtained through the normalization processing includes at least one feature value of a value obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

The memory 1803 is configured to store a program and the like. Specifically, the program may include program code, and the program code includes a computer operation instruction. The memory 1803 may include a RAM, and may further include a nonvolatile memory, for example, at least one magnetic disk memory. The processor 1802 executes an application program stored in the memory 1803 to implement the foregoing functions, thereby implementing the method for obtaining service data provided in the embodiment of this application.

The data analysis network element provided in this embodiment of this application may be configured to obtain the service data from the service network element. In this way, the data analysis network element can perform big data analysis on the obtained service data, thereby implementing differentiated service assurance.

Figure 19:
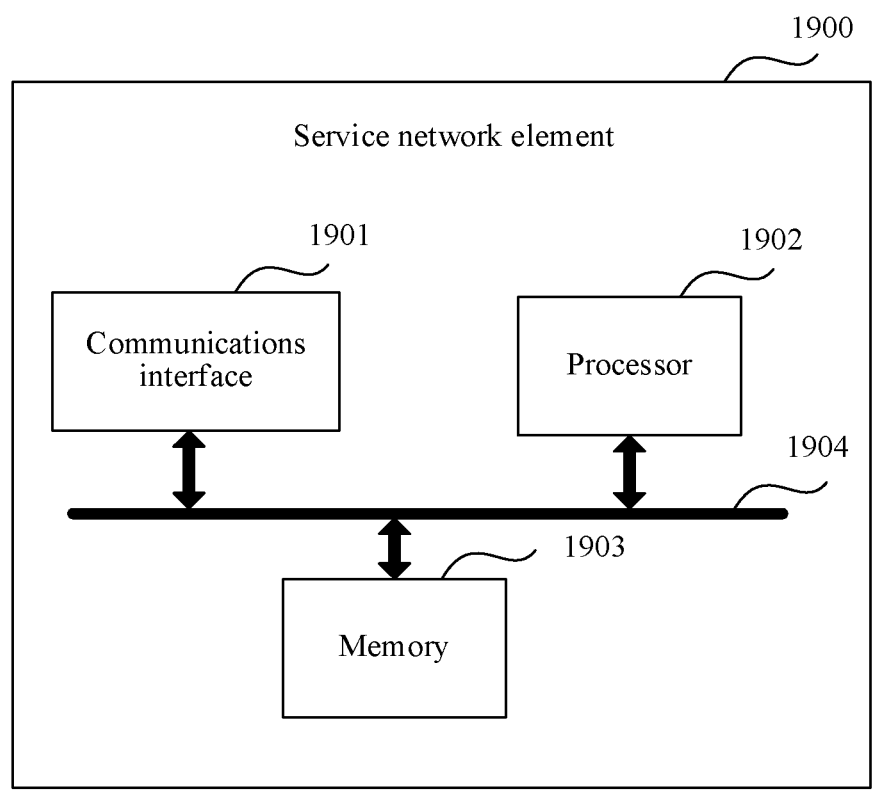
FIG. 19 is a structural diagram of a service network element according to this application.

Based on the foregoing embodiments, an embodiment of this application further provides a service network element. The service network element is applied to the first service network element or the second service network element in the communications system shown in FIG. 1, and is configured to implement the foregoing method for obtaining service data. Referring to FIG. 19, the service network element 1900 includes a communications interface 1901, a processor 1902, and a memory 1903. The processor 1902 may be a CPU, an NP, or a combination of a CPU and an NP. The processor 1902 may further include a hardware chip. The hardware chip may be an ASIC, a PLD, or a combination thereof. The PLD may be a CPLD, an FPGA, a GAL, or any combination thereof.

The communication interface 1901, the processor 1902, and the memory 1903 are interconnected. Optionally, the communications interface 1901, the processor 1902, and the memory 1903 are interconnected by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

When the service network element 1900 implements the method for obtaining service data provided in an embodiment of this application, the communications interface 1901 is configured to receive and send data, and the processor 1902 is configured to send service data to a data analysis network element by using the communications interface. The service data includes at least one or a combination of the following: a service identifier, first data, and second data, where the service identifier is used to identify a service type corresponding to the service data, the first data includes a terminal identifier, and the second data includes a feature value list obtained through normalization processing.

In an optional implementation, before sending the service data to the data analysis network element by using the communications interface 1901, the processor 1902 is further configured to: send a service identifier allocation request to the data analysis network element by using the communications interface 1901, and receive a service identifier allocation response from the data analysis network element by using the communications interface 1901, where the service identifier allocation response includes the service identifier.

In an optional implementation, when sending the service identifier allocation request to the data analysis network element by using the communications interface 1901, the processor 1902 is specifically configured to send the service identifier allocation request to the data analysis network element by using the communications interface 1901 and a network exposure network element. And when receiving the service identifier allocation response from the data analysis network element by using the communications interface 1901, the processor 1902 is configured to receive, by using the communications interface 1901 and the network exposure network element, the service identifier allocation response sent by the data analysis network element, where the service identifier allocation response includes the service identifier.

In an optional implementation, when sending the service data to the data analysis network element by using the communications interface 1901, the processor 1902 is configured to directly send the service data to the data analysis network element by using the communications interface 1901.

In an optional implementation, when sending the service data to the data analysis network element by using the communications interface 1901, the processor 1902 is configured to: receive a data request from the data analysis network element by using the communications interface 1901, where the data request includes the service identifier corresponding to the service data; and send the service data corresponding to the service identifier to the data analysis network element by using the communications interface 1901.

In an optional implementation, the service identifier includes at least one or a combination of the following: a public land mobile network identifier PLMN ID, a service identifier Service ID, and an analytic identifier Analytic ID.

In an optional implementation, when sending the service data to the data analysis network element by using the communications interface 1901, the processor 1902 is configured to send the service data to the data analysis network element by using the communications interface 1901 and the network exposure network element.

In an optional implementation, the first data further includes at least one or a combination of the following: a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

In an optional implementation, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

The memory 1903 is configured to store a program and the like. Specifically, the program may include program code, and the program code includes a computer operation instruction. The memory 1903 may include a RAM, and may further include a nonvolatile memory, for example, at least one magnetic disk memory. The processor 1902 executes an application program stored in the memory 1903 to implement the foregoing functions, thereby implementing the method for obtaining service data provided in the embodiment of this application.

After obtaining data composition information corresponding to the service data, the service network element provided in this embodiment of this application is configured to: process initial service data into the service data conforming to the data composition information, and send the service data to the data analysis network element. In this way, the data analysis network element can perform big data analysis on the obtained service data, thereby implementing differentiated service assurance.

Figure 20:
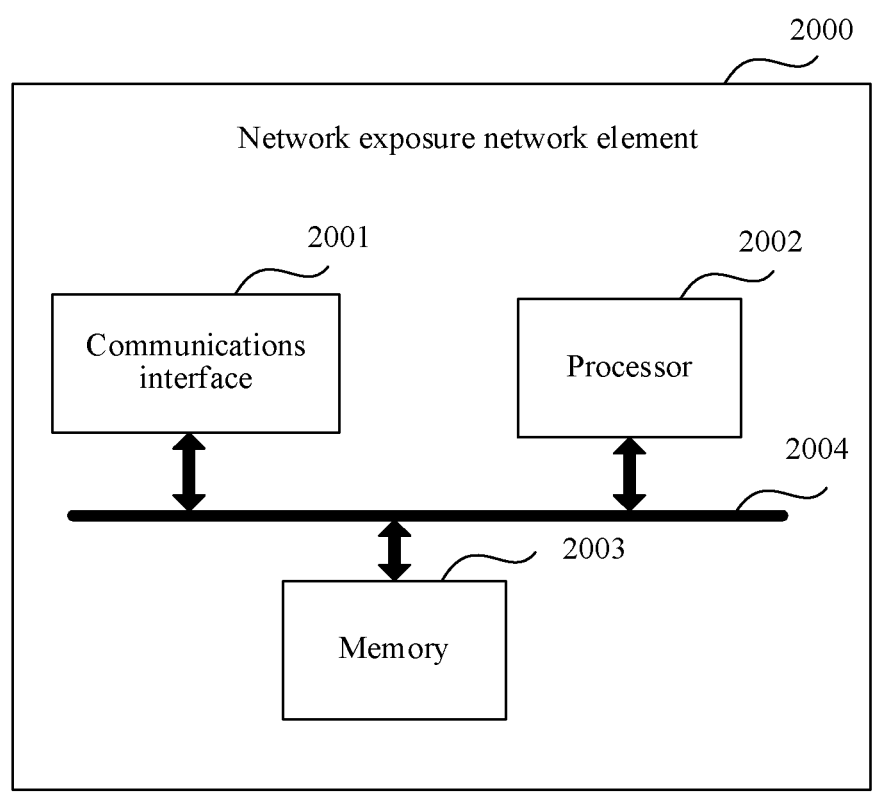
FIG. 20 is a structural diagram of a network exposure network element according to this application.

Based on the foregoing embodiments, an embodiment of this application further provides a network exposure network element. The network exposure network element is applied to the network exposure network element in the communications system shown in FIG. 1. Referring to FIG. 20, the network exposure network element 2000 includes a communications interface 2001, a processor 2002, and a memory 2003. The processor 2002 may be a CPU, an NP, or a combination of a CPU and an NP. The processor 2002 may further include a hardware chip. The hardware chip may be an ASIC, a PLD, or a combination thereof. The PLD may be a CPLD, an FPGA, a GAL, or any combination thereof.

The communication interface 2001, the processor 2002, and the memory 2003 are interconnected. Optionally, the communications interface 2001, the processor 2002, and the memory 2003 are interconnected by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

When the network exposure network element 2000 implements the method for obtaining service data provided in an embodiment of this application, the communications interface 2001 is configured to receive and send data. The processor 2002 is configured to: receive, by using the communications interface 2001, service data sent by the service network element, and send the service data to the data analysis network element by using the communications interface 2001. The service data includes at least one or a combination of the following: a service identifier, first data, and second data, where the service identifier is used to identify a service type corresponding to the service data, the first data includes a terminal identifier, and the second data includes a feature value list obtained through normalization processing.

In an optional implementation, the processor 2002 is further configured to send the service data to a database network element by using the communications interface 2001 after receiving the service data by using the communications interface 2001.

In an optional implementation, when sending the service data to the data analysis network element by using the communications interface 2001, the processor 2002 is specifically configured to: receive a data request from the data analysis network element by using the communications interface 2001, where the data request includes the service identifier corresponding to the service data; and send, by using the communications interface 2001, the service data corresponding to the service identifier to the data analysis network element.

In an optional implementation, when sending the service data to the data analysis network element by using the communications interface 2001, the processor 2002 is specifically configured to send the service data to the data analysis network element by using the communications interface 2001.

In an optional implementation, the processor 2002 is further configured to: before sending the service data to the data analysis network element by using the communications interface 2001, send a data query request to the database network element by using the communications interface 2001, where the data query request includes the service identifier corresponding to the service data; and receive, by using the communications interface 2001, the service data corresponding to the service identifier from the database network element.

In an optional implementation, the service identifier includes at least one or a combination of the following: a public land mobile network identifier PLMN ID, a service identifier Service ID, and an analytic identifier Analytic ID.

In an optional implementation, the first data further includes at least one or a combination of the following: a service start time, a service end time, service experience information, and a communication mode.

In an optional implementation, the terminal identifier includes at least one or a combination of the following: a terminal IP, a terminal port number, a service server IP, a service server port number, a transmission protocol, an IMSI, an IMEI, and an MSISDN.

In an optional implementation, the feature value list obtained through the normalization processing includes at least one feature value of a value obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing facilitates model training convergence speed improvement in a big data analysis process in one aspect, and provides a feature data transmission mode in another aspect.

The memory 2003 is configured to store a program and the like. Specifically, the program may include program code, and the program code includes a computer operation instruction. The memory 2003 may include a RAM, and may further include a nonvolatile memory, for example, at least one magnetic disk memory. The processor 2002 executes an application program stored in the memory 2003 to implement the foregoing functions, thereby implementing the method for obtaining service data provided in the embodiment of this application.

The network exposure network element provided in this embodiment of this application may be configured to send, to the data analysis network element, the service data from the service network element. In this way, the data analysis network element can perform big data analysis on the obtained service data, thereby implementing differentiated service assurance.

Figure 21:
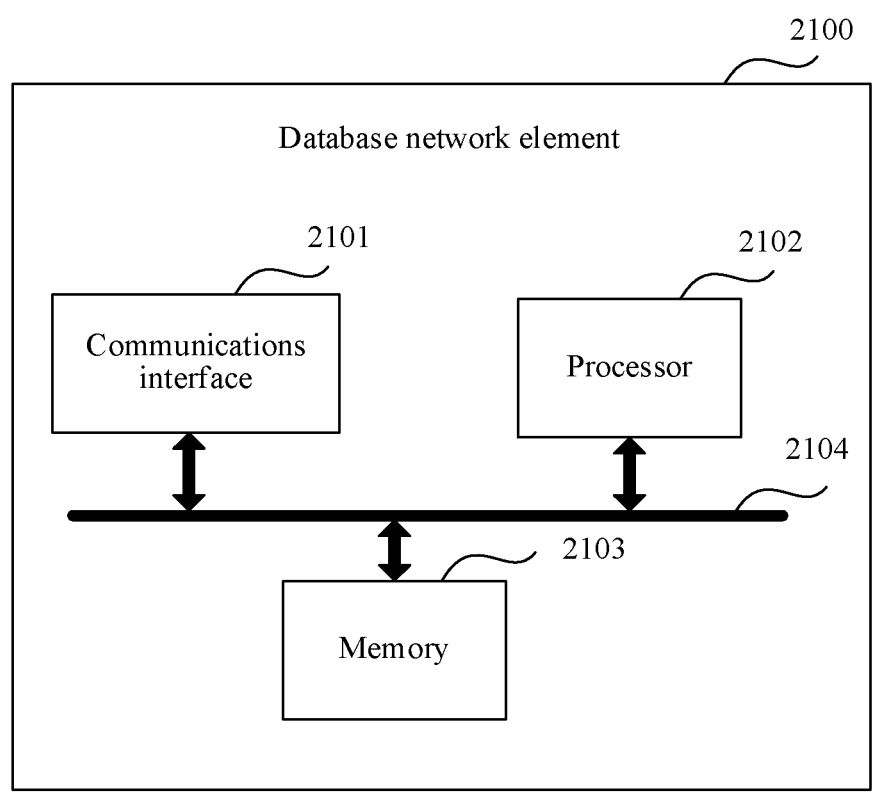
FIG. 21 is a structural diagram of a database network element according to this application.

Based on the foregoing embodiments, an embodiment of this application further provides a database network element, and the database network element is applied to the database network element in the communications system shown in FIG. 1. Referring to FIG. 21, the database network element 2100 includes a communications interface 2101, a processor 2102, and a memory 2103. The processor 2102 may be a CPU, an NP, or a combination of a CPU and an NP. The processor 2102 may further include a hardware chip. The hardware chip may be an ASIC, a PLD, or a combination thereof. The PLD may be a CPLD, an FPGA, a GAL, or any combination thereof.

The communication interface 2101, the processor 2102, and the memory 2103 are interconnected. Optionally, the communications interface 2101, the processor 2102, and the memory 2103 are interconnected by using a bus 2104. The bus 2104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 21, but this does not mean that there is only one bus or only one type of bus.

When the database network element 2100 implements the method for obtaining service data provided in an embodiment of this application, the communications interface 2101 is configured to receive and send data. And the processor 2102 is configured to: receive, by using the communications interface 2101, service data sent by a network exposure network element, and store the service data into the database network element 2100, where the service data includes at least one or a combination of the following: a service identifier, first data, and second data, where the service identifier is used to identify a service type corresponding to the service data, the first data includes a terminal identifier, and the second data includes a feature value list obtained through normalization processing. Specifically, the memory 2103 in the database network element 2100 may be configured to store the service data.

In an optional implementation, the feature value list obtained through the normalization processing includes at least one feature value of a feature obtained through the normalization processing, and the normalization processing includes mapping a physical data value of the feature to a fixed data value space. The normalization processing is mainly mapping a physical data value of each feature to a fixed data value space by using a min-max normalization method, a Z-Score normalization method, or the like. This processing improves model training convergence speed in a big data analysis process in one aspect, and provides a feature data transmission mode in another aspect.

In an optional implementation, the processor 2102 is further configured to: receive a data query request from the network exposure network element by using the communications interface 2101, where the data query request includes the service identifier corresponding to the service data; and send the service data to the network exposure network element by using the communications interface 2101 after determining, in the database network element 2100, the service data corresponding to the service identifier.

In an optional implementation, the service identifier includes at least one or a combination of the following: a public land mobile network identifier PLMN ID, a service identifier Service ID, and an analytic identifier Analytic ID.

Optionally, the first data further includes at least one or a combination of the following: a service start time, a service end time, service experience information, and a communication mode.

Optionally, the terminal identifier includes at least one or a combination of the following: a terminal IP, a terminal port number, a service server IP, a service server port number, a transmission protocol, an IMSI, an IMEI, and an MSISDN.

The memory 2103 is configured to store a program and the like. Specifically, the program may include program code, and the program code includes a computer operation instruction. The memory 2103 may include a RAM, and may further include a nonvolatile memory, for example, at least one magnetic disk memory. The processor 2102 executes an application program stored in the memory 2103 to implement the foregoing functions, thereby implementing the method for obtaining service data provided in the embodiment of this application.

The database network element provided in this embodiment of this application is configured to store the service data into the database network element after receiving the service data sent by the network exposure network element, so that the network exposure network element can send the service data to the data analysis network element subsequently after querying the service data from the database network element. In this way, the data analysis network element can obtain the service data that is from the network exposure network element and that conforms to data composition information, and can perform big data analysis on the obtained service data, thereby implementing differentiated service assurance.

In conclusion, according to the method for obtaining service data and apparatus provided in the embodiments of this application, the data analysis network element can obtain the service data that is from the network exposure network element and that conforms to the data composition information, so that the data analysis network element can perform the big data analysis on the obtained service data, thereby implementing the differentiated service assurance.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the scope of protection defined by the following claims and their equivalent technologies.

What is claimed is:

1. A method for obtaining service data, comprising:

sending, by a data analysis network device, a first data request to a service network device, wherein the first data request comprises a service identifier corresponding to the service data and the service identifier is used to identify a service type of the service data;

receiving, by the data analysis network device, the service data corresponding to the service identifier from the service network device, wherein the service data comprises a combination of the following: the service identifier, first data, and second data, wherein the first data comprises a terminal identifier, and the second data comprises a feature value list obtained through normalization processing.

2. The method according to claim 1, wherein before the receiving, by the data analysis network device, the service data from the service network device, the method further comprises:

receiving, by the data analysis network device, a service identifier allocation request from the service network device;

obtaining, by the data analysis network device, the service identifier; and sending, by the data analysis network device, a service identifier allocation response to the service network device, wherein the service identifier allocation response comprises the service identifier.

3. The method according to claim 2, wherein the receiving, by the data analysis network device, the service identifier allocation request from the service network device comprises:

receiving, by the data analysis network device, the service identifier allocation request from the service network device by using a network exposure network device; and the sending, by the data analysis network device, a service identifier allocation response to the service network device comprises:

sending, by the data analysis network device, the service identifier allocation response to the service network device by using the network exposure network device, wherein the service identifier allocation response comprises the service identifier.

4. The method according to claim 1, wherein the service identifier comprises at least one or a combination of the following: a public land mobile network identifier (PLMN ID), a service identifier, and an analytic identifier.

5. The method according to claim 1, wherein the first data further comprises: a service start time, a service end time, service experience information, and a communication mode.

6. The method according to claim 1, wherein the terminal identifier comprises at least one or a combination of the following: a terminal Internet Protocol (IP) address, a terminal port number, a service server IP address, a service server port number, a transmission protocol identifier, an international mobile subscriber identity (IMSI), an international mobile equipment identity (IMEI), and a mobile subscriber international integrated services digital network number (MSISDN).

7. The method according to claim 1, wherein the feature value list obtained through the normalization processing comprises at least one feature value of a feature obtained through the normalization processing, and the normalization processing comprises mapping a physical data value of the feature to a fixed data value space.

* * * * *